United States Patent
Agarwal et al.

(10) Patent No.: US 9,607,049 B2
(45) Date of Patent: Mar. 28, 2017

(54) SYSTEMS AND METHODS TO BUILD AND UTILIZE A SEARCH INFRASTRUCTURE

(71) Applicant: eBay Inc., San Jose, CA (US)

(72) Inventors: Swati Agarwal, Sunnyvale, CA (US); Richard D Henderson, San Jose, CA (US); Davide Libenzi, San Jose, CA (US); Jagadish Nallapaneni, San Jose, CA (US); Pradeep Sankaranthi, Fremont, CA (US); Nicholas Whyte, San Jose, CA (US); Thomas Pan, Mountain View, CA (US); Carson Hoffacker, Mountain View, CA (US); Amit Basu, San Jose, CA (US); Gang He, Union City, CA (US); Mel Sun, San Jose, CA (US); Andrew John Melnick, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 546 days.

(21) Appl. No.: 13/730,536

(22) Filed: Dec. 28, 2012

(65) Prior Publication Data

US 2014/0032566 A1  Jan. 30, 2014

Related U.S. Application Data

(60) Provisional application No. 61/675,793, filed on Jul. 25, 2012.

(51) Int. Cl.
G06F 17/30 (2006.01)

(52) U.S. Cl.
CPC .... G06F 17/3053 (2013.01); G06F 17/30011 (2013.01); G06F 17/30321 (2013.01);
(Continued)

(58) Field of Classification Search
CPC ............................ G06F 2201/84; G06F 17/30
USPC ... 707/E17.005, E17.01, E17.014, 639, 769, 707/E17.007, E17.032, 634, 741, 707/999.003, E17.001, E17.002, 707/E17.009, E17.044, E17.108, 610, 707/611, 624, 758, 770, 802, 999.101,
(Continued)

(56) References Cited

U.S. PATENT DOCUMENTS

RE32,773 E    10/1988 Goldwasser et al.
5,347,653 A *  9/1994 Flynn et al. ................. 707/695
(Continued)

OTHER PUBLICATIONS

"U.S. Appl. No. 13/711,287, Examiner Interview Summary mailed Feb. 5, 2015", 3 pgs.
(Continued)

Primary Examiner — Jay Morrison
Assistant Examiner — Ken Hoang
(74) Attorney, Agent, or Firm — Schwegman, Lundberg & Woessner, P.A.

(57) ABSTRACT

Methods and systems to build and utilize a search infrastructure are described. The system generates index information components in real-time based on a database that is time-stamped. The system updates index information at a plurality of query node servers based on the index information components. A query engine receives a search query from a client machine and identifies search results based on the query and the index information. The system communicates the search results, over the network, to the client machine.

12 Claims, 21 Drawing Sheets

(52) U.S. Cl.
CPC .. *G06F 17/30424* (2013.01); *G06F 17/30622* (2013.01); *G06F 17/30702* (2013.01)

(58) Field of Classification Search
USPC .................. 707/999.102, E17.012, E17.033, 707/E17.052, E17.135, E17.136, 609, 707/636, 638, 650, 655, 662, 672, 673, 707/674, 685, 688, 690, 695, 709, 719, 707/747, 776, 797, 812, 823, 827, 707/999.001, 999.004, 999.005, 999.1, 707/999.107, 999.202, 999.203, 999.205; 711/E12.103, E12.001, 162, 112, 118, 711/128, 156
See application file for complete search history.

(56) References Cited

U.S. PATENT DOCUMENTS

| | | | |
|---|---|---|---|
| 5,576,734 | A | 11/1996 | Daniele et al. |
| 6,009,425 | A * | 12/1999 | Mohan |
| 6,438,579 | B1 | 8/2002 | Hosken |
| 6,502,233 | B1 | 12/2002 | Vaidyanathan et al. |
| 6,701,362 | B1 | 3/2004 | Subramonian et al. |
| 7,376,642 | B2 | 5/2008 | Nayak et al. |
| 7,647,580 | B2 | 1/2010 | Meijer et al. |
| 7,925,676 | B2 | 4/2011 | Hogue et al. |
| 8,051,385 | B1 | 11/2011 | Yawitz et al. |
| 8,214,380 | B1 | 7/2012 | Bettinger et al. |
| 8,392,444 | B2 | 3/2013 | Shwartz et al. |
| 8,601,474 | B2 | 12/2013 | Konik et al. |
| 8,655,869 | B2 | 2/2014 | Ferrari et al. |
| 9,081,821 | B2 | 7/2015 | Song et al. |
| 9,158,768 | B2 | 10/2015 | Lakshminath et al. |
| 2002/0065802 | A1 | 5/2002 | Uchiyama |
| 2003/0229639 | A1 | 12/2003 | Carlson et al. |
| 2004/0199899 | A1* | 10/2004 | Powers et al. ................. 717/120 |
| 2005/0010606 | A1 | 1/2005 | Kaiser et al. |
| 2005/0015381 | A1 | 1/2005 | Clifford et al. |
| 2005/0071328 | A1 | 3/2005 | Lawrence |
| 2005/0240580 | A1 | 10/2005 | Zamir et al. |
| 2005/0283473 | A1 | 12/2005 | Rousso et al. |
| 2006/0279628 | A1* | 12/2006 | Fleming ........................ 348/143 |
| 2007/0130126 | A1 | 6/2007 | Lucovsky et al. |
| 2007/0198500 | A1 | 8/2007 | Lucovsky et al. |
| 2007/0288490 | A1* | 12/2007 | Longshaw .................... 707/100 |
| 2008/0104574 | A1 | 5/2008 | Mak et al. |
| 2008/0183735 | A1 | 7/2008 | Bruckner et al. |
| 2008/0208844 | A1 | 8/2008 | Jenkins |
| 2009/0063422 | A1* | 3/2009 | Kodama ........................ 707/3 |
| 2009/0228528 | A1 | 9/2009 | Ercegovac et al. |
| 2009/0327228 | A1 | 12/2009 | Krause et al. |
| 2009/0327314 | A1 | 12/2009 | Kim et al. |
| 2010/0228715 | A1 | 9/2010 | Lawrence |
| 2010/0250578 | A1 | 9/2010 | Athsani et al. |
| 2010/0269090 | A1 | 10/2010 | Le Merrer |
| 2010/0306229 | A1 | 12/2010 | Timm et al. |
| 2010/0312724 | A1 | 12/2010 | Pinckney et al. |
| 2011/0055241 | A1 | 3/2011 | Lewis |
| 2011/0218986 | A1 | 9/2011 | O'hanlon |
| 2012/0016875 | A1 | 1/2012 | Jin et al. |
| 2012/0130706 | A1 | 5/2012 | Qiu et al. |
| 2013/0124514 | A1 | 5/2013 | Datta et al. |
| 2013/0166494 | A1 | 6/2013 | Davis et al. |
| 2014/0032517 | A1 | 1/2014 | Henderson et al. |
| 2014/0032532 | A1 | 1/2014 | Song et al. |
| 2014/0032593 | A1 | 1/2014 | Libenzi et al. |
| 2014/0222856 | A1 | 8/2014 | Lakshminath et al. |
| 2016/0026686 | A1 | 1/2016 | Lakshminath et al. |

OTHER PUBLICATIONS

"U.S. Appl. No. 13/711,287, Examiner Interview Summary mailed Jul. 28, 2014", 3 pgs.
"U.S. Appl. No. 13/711,287, Examiner Interview Summary mailed Oct. 2, 2014", 3 pgs.
"U.S. Appl. No. 13/711,287, Final Office Action mailed Dec. 8, 2014", 12 pgs.
"U.S. Appl. No. 13/711,287, Non Final Office Action mailed Apr. 24, 2014", 12 pgs.
"U.S. Appl. No. 13/711,287, Non Final Office Action mailed Aug. 20, 2014", 12 pgs.
"U.S. Appl. No. 13/711,287, Response filed Feb. 19, 2015 to Final Office Action mailed Dec. 8, 2014", 13 pgs.
"U.S. Appl. No. 13/711,287, Response filed Jul. 24, 2014 to Non Final Office Action mailed Apr. 2, 2014", 12 pgs.
"U.S. Appl. No. 13/711,287, Response filed Oct. 20, 2014 to Non Final Office Action mailed Aug. 20, 2014", 12 pgs.
"U.S. Appl. No. 13/730,583, Non Final Office Action mailed Sep. 22, 2014", 17 pgs.
"U.S. Appl. No. 13/730,583, Response filed Feb. 20, 2015 to Non Final Office Action mailed Sep. 22, 2014", 12 pgs.
"U.S. Appl. No. 13/759,786, Non Final Office Action mailed Oct. 27, 2014", 8 pgs.
"U.S. Appl. No. 13/730,583, Advisory Action mailed Aug. 13, 2015", 3 pgs.
"U.S. Appl. No. 13/730,583, Examiner Interview Summary mailed Feb. 3, 2015", 3 pgs.
"U.S. Appl. No. 13/730,583, Examiner Interview Summary mailed Sep. 27, 2016", 3 pgs.
"U.S. Appl. No. 13/730,583, Final Office Action mailed May 25, 2016", 31 pgs.
"U.S. Appl. No. 13/730,583, Final Office Action mailed May 27, 2015", 23 pgs.
"U.S. Appl. No. 13/730,583, Non Final Office Action mailed Dec. 14, 2015", 30 pgs.
"U.S. Appl. No. 13/730,583, Response Filed Apr. 14, 2016 to Non Final Office Action mailed Dec. 14, 2015", 10 pgs.
"U.S. Appl. No. 13/730,583, Response filed Jul. 27, 2015 to Final Office Action mailed May 27, 2015", 12 pgs.
"U.S. Appl. No. 13/730,583, Response filed Sep. 28, 2015 to Advisory Action maield Aug. 13, 2015", 13 pgs.
"U.S. Appl. No. 13/730,583, Response filed Oct. 3, 2016 to Final Office Action mailed May 25, 2016", 13 pgs.

* cited by examiner

FIG.3A

ITEMS TABLE — 21

COL-1 | COL-2 | COL-3 | COL-4 | COL-N

98

92

96 { QN | QN | QN | QN | QN — 30
QN | QN | QN | QN | QN
QN | QN | QN | QN | QN
QN | QN | QN | QN | QN
QN | QN | QN | QN | QN
QN | QN | QN | QN | QN

94

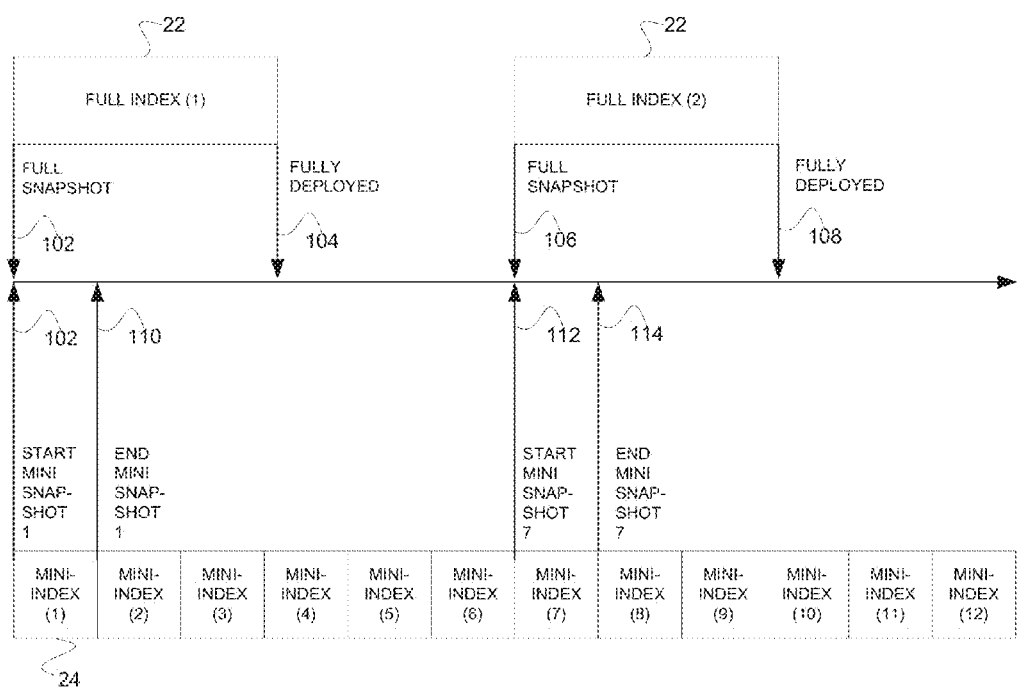

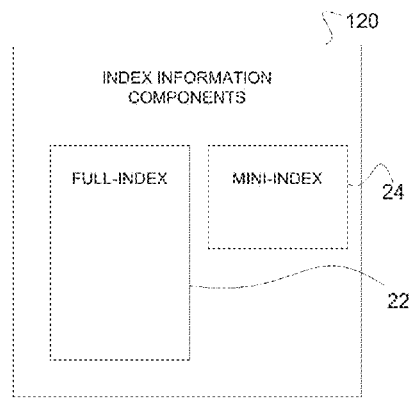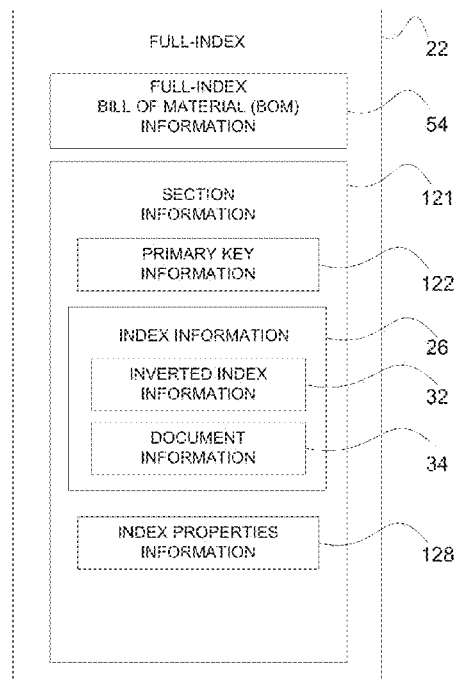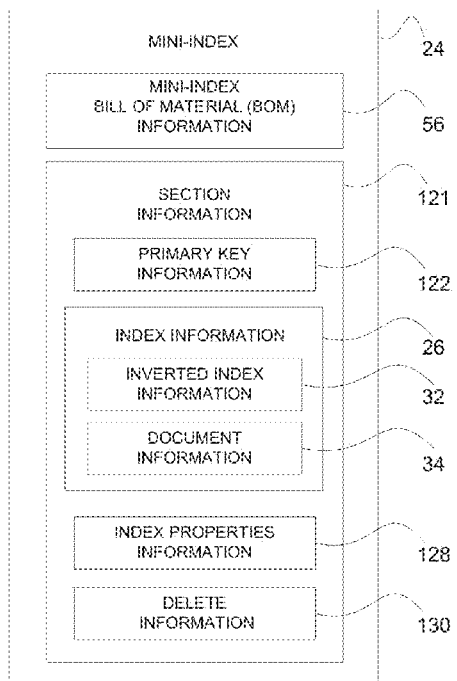

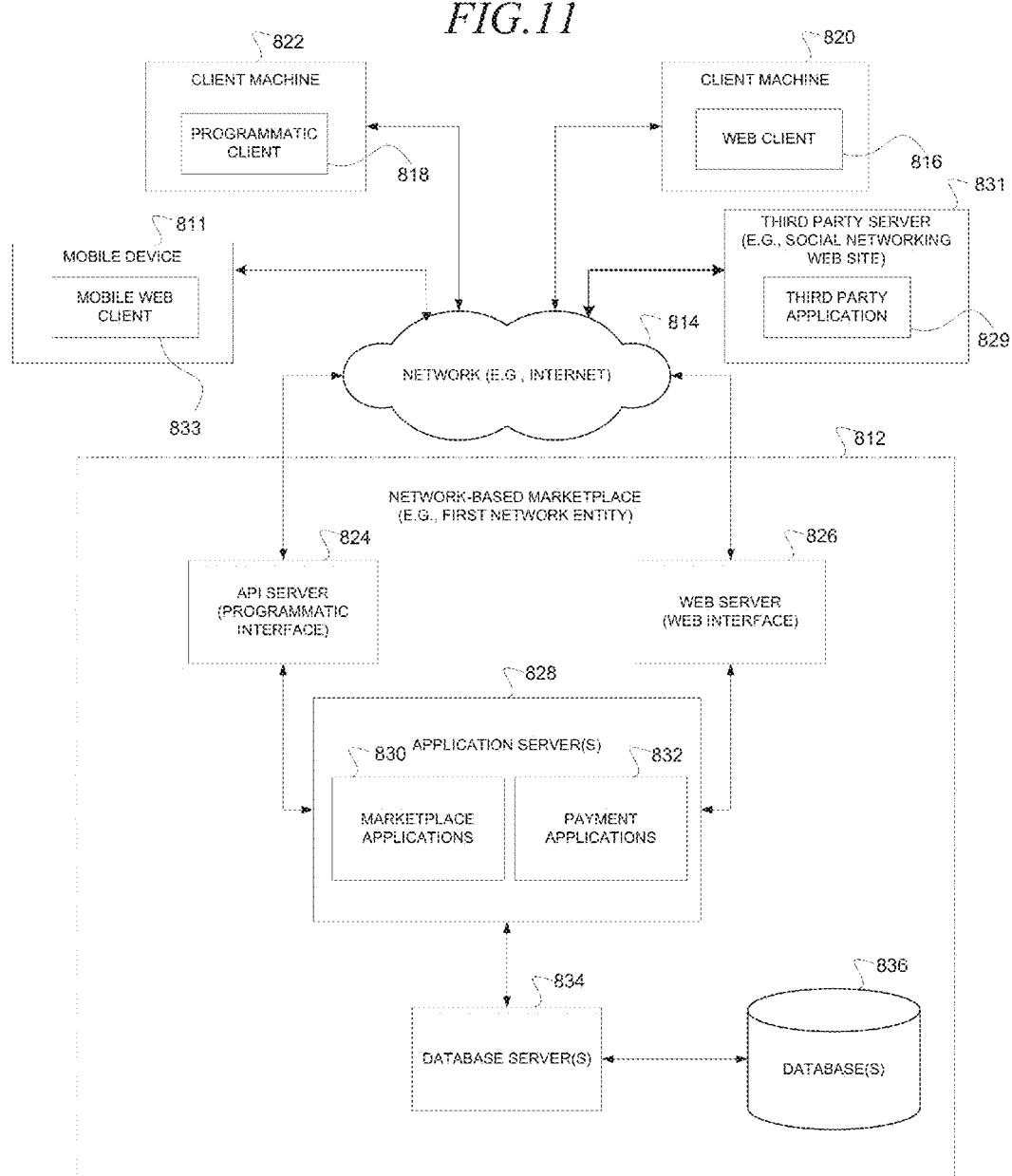

SYSTEMS AND METHODS TO BUILD AND UTILIZE A SEARCH INFRASTRUCTURE

RELATED APPLICATIONS

This application claims priority to U.S. Provisional Application No. 61/675,793, filed on Jul. 25, 2012, and entitled, "SYSTEMS AND METHODS TO BUILD AND UTILIZE A SEARCH INFRASTRUCTURE," which is hereby incorporated by reference in its entirety.

TECHNICAL FIELD

This disclosure relates to the technical field of data storage and retrieval. More particularly, systems and methods to build and utilize a search infrastructure.

RELATED ART

A search infrastructure supports the storage of data items in one or more databases and the retrieval of the data items from the one or more databases. Building and utilizing the search infrastructure may present many technical challenges. In particular the performance, manageability, and quality of service in storing and retrieving the data items may present many opportunities for innovation.

BRIEF DESCRIPTION OF THE DRAWINGS

Embodiments illustrated, by way of example and not limitation, in the figures of the accompanying drawings, in which:

FIG. 3A is a block diagram that illustrates the items table in association with regions, according to an embodiment;

FIG. 3B is a block diagram that illustrates regions in association with a column, a column of query node servers and a grid of query node servers, according to an embodiment;

FIG. 4 is a block diagram illustrating a time-line, according to an embodiment, to generate a full-index and a mini-index;

FIG. 5A is a block diagram illustrating index information components, according to an embodiment;

FIG. 5B is a block diagram illustrating a full-index, according to an embodiment;

FIG. 5C is a block diagram illustrating a mini-index, according to an embodiment;

FIG. 11 is a network diagram depicting a networked system, according to an embodiment;

DETAILED DESCRIPTION

In the following description, for purposes of explanation, numerous specific details are set forth in order to provide a thorough understanding of some example embodiments. It will be evident, however, to one of ordinary skill in the art that embodiments of the present disclosure may be practiced without these specific details.

As described further below, according to various example embodiments of the disclosed subject matter described and claimed herein, systems and methods to build and utilize a search infrastructure are provided. Various embodiments are described below in connection with the figures provided herein.

Figure 1:
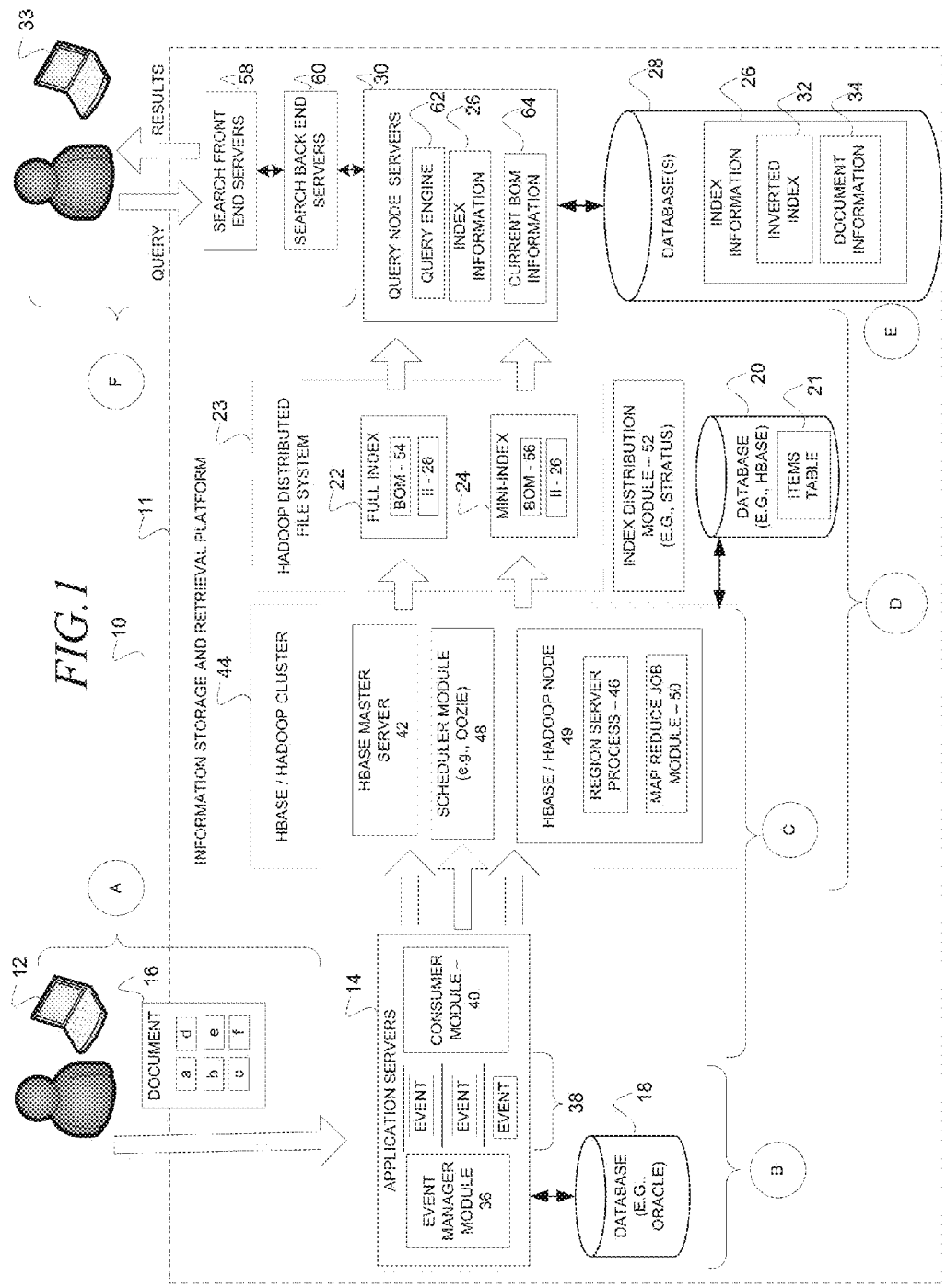
FIG. 1 is a block diagram that illustrates a system, according to an embodiment, to build and utilize a search infrastructure.

FIG. 1 illustrates a system 10 to build and utilize a search infrastructure, according to an embodiment. The system 10 may include an information storage and retrieval platform 11 that is communicatively coupled over a network (e.g., Internet) (not shown) to a client machine 12 and a client machine 33.

Illustrated on the top left is an operation A that describes a first user operating the client machine 12 to interact with an application server 14 to store or update a document 16 in a database 18; illustrated in the middle are operations B, C, D, E that describe retrieving and transforming the contents of the database 18, storing the transformed contents in a database 20 that is time-stamped, retrieving the contents from the database 20 to generate a full-index 22 and a set of mini-indexes 24 which are utilized to generate and continually update the index information 26 in the database 28 to be consumed and served by the query node servers 30; and illustrated on the top right is an operation F that describes a second user who operates a client machine 33 to enter a query that is received by one or more query node servers 30 that, in turn, apply the query to the index information 26 to identify and return search results that reference the document 16. The above operations to continually rebuild the index information 26 are performed in real-time and without interruption to service that is provided to the first and second users who continue to interact with the system 10.

The index information 26 may include an inverted index 32 and document information 34. An inverted index (e.g., inverted index 32), as is well known in the art, is an index data structure storing a mapping from content (e.g., content contained by the document 16), such as words or numbers, to its locations in a database file, or in a document (e.g., document 16) or a set of documents. The documents 16 (e.g., document data, column group data) and/or information contained by the documents 16 may be stored in the document information 34.

Merely for example a "document X" may include the words "apple," "orange," and "banana;" a "document Y" may include the words "apple" and "orange; and, a "document Z" may include the word "apple." An inverted index for the words in documents X, Y, and Z may be generated as follows:

| Word | Document |
|---|---|
| apple | X(1), Y(1), Z(1) |
| orange | X(2), Y(2) |
| banana | X(3) |

The above inverted index may be utilized to identify the word "apple" as being positioned in the first word of documents X, Y, and Z; the word "orange" as being positioned in the second word of the documents X and Y; and the word "banana" as being positioned as the third word of the document X. Accordingly, the above inverted index may be utilized to map a keyword "apple" contained in a query that is received from a client computer to the documents X, Y, and Z that are further referenced in search results that are returned to the client computer. It is appreciated by one skilled in the art that the inverted index 32 corresponds to the underlying database that it describes. Accordingly, any update to the underlying database is reflected in a corresponding update to the inverted index 32. Updates to the database 28 may include the addition and deletion of documents 16 in the document information 34 as well as the update of any of the contents contained by the documents 16 in the document information 34. In the present embodiment, the index information 26 may be updated in real time to respond to a query in real time with accurate search results that include the most recent document information 34. To this end, the operations A-F are now further described.

The information storage and retrieval platform 11 includes multiple components including the application servers 14 that may execute on one or more application server machines (not shown), the database 18, a database 20, an Hadoop distributed file system 23, the database 28, the query node servers 30 that operate on query node server machines (not shown), an HBase/Hadoop Cluster 44 comprised of one or more HBase/Hadoop machines (not shown) including an HBase Hadoop Node 49 (e.g, HBase/Hadoop machine), an index distribution module 52 executing on HBase/Hadoop machine, search front-end servers 58 that executes on search machines (not shown), and search back-end servers 60 that execute on search machines (not shown) as being communicatively coupled together. For example, the multiple components may be communicatively coupled with any combination of a wide area network, local area network, wireless network, or any other type of network utilizing various networking technologies.

At operation A, the document 16, or one or more elements of the document 16, may be communicated from the client machine 12 to the application servers 14 and stored in the database 18 (e.g., Oracle database). The document 16 may include multiple elements including elements a, b, c, d, e, and f that may include strings of text, numeric information, scores, or other discrete quantum of information that are positioned in different sections or fields of the document (e.g., item information).

At operation B, at the application servers 14, event manager modules 36 may identify updates to the database 18, generate events that correspond to the respective updates, prioritize the events according to the quality of the data in the event and communicate the prioritized events into event queues 38 that are consumed by consumer modules 40 that service the respective event queues 38. According to an embodiment, the event manager modules 36 and the consumer modules 40 may utilize three event queues 38 to process and prioritize event types. For example, the update of the "element a" in the document 16 in the database 18 may be a price change to item information describing an item for sale that causes the generation of a corresponding event that is associated with a high priority that, in turn, is communicated into in a first event queue associated with high priority that, in turn, is received by a consumer module 40. Similarly, the update of the "element b" in document 16 in the database 18 may be a change to a title of the item that causes the generation of an event that is associated with a medium priority that, in turn, is communicated into a second event queue associated with the medium priority that, in turn, is received by a consumer module 40. Finally, the update of the "element c" in document 16 in the database 18 may be a change to a description of the item that causes the generation of an event that is communicated into a third event queue associated with a low priority that, in turn, is received by a consumer module 40. Accordingly, the three event queues 38 may be utilized to communicate events in high, medium, and low priorities to facilitate a preference for the update of high priority events (e.g., price) over medium priority events (e.g., title) over low priority events (e.g. description). In some embodiments the priority for the respective event types may be configured. Other embodiments may include fewer or more event queues 38.

At operation C, the consumer modules 40 may transform the data in the events and communicate the transformed data via an HBase application programming interface to an HBase master server 42 in an HBase/Hadoop cluster 44 that, in turn, stores the transformed data in one or more tables including an items table 21 in the database 20 (e.g., HBase). The transformed data may be stored according to regions that are managed by region server processes 46. According to an embodiment, the database 20 may be embodied as an open source non-relational, distributed database (e.g., HBase) that runs on a Hadoop Distributed Filesystem (HDFS) 23. HDFS 23 is an open source software framework that supports data-intensive distributed applications, known by those skilled in the art. The HBase/Hadoop cluster 44 may further includes the HBase master server 42 that is utilized to manage the HBase/HDFS environment, a scheduler module 48, and an HBase/Hadoop node 49 that includes multiple region server processes 46 and a map-reduce job module 50. Each region server process 46 may further be associated with a column (not shown) that corresponds to a range of documents (e.g., or items corresponding to item information in the items table 21) and may be utilized to manage one or more regions (not shown) that respectively correspond to a range of the documents 16. For example, the documents 16 may be uniquely identified with document identifiers (e.g., item identifiers) that are numbered from 0 to X where each column and region are dedicated to respective overlapping predetermined ranges of documents (e.g., documents (0-100 and documents (0-50), as described further in this document. According to one embodiment, the number of region server processes 46 may be in the hundreds but scaling is not limited to any fixed number. HBase is a technology that provides a fault-tolerant way of storing large quantities of sparse data featuring compression, in-memory operation, and a space-efficient probabilistic data structure (e.g., Bloom filters) on a per-column basis as outlined in the original BigTable paper, as is known by those skilled in the art. An items table 21 in the database 20 (e.g. HBase) may serve as the input and output for one or more map-reduce jobs that are scheduled by the map-reduce job module 50. The map-reduce jobs may be embodied as a map jobs and reduce jobs that runs in HDFS. The items table 21 in the database 20 may further be accessed through the Java Application Programming Interface (API) but also through representational state transfer (REST) architecture and other APIs.

At operation D, the scheduler module 48, executing in the HBase/Hadoop cluster 44, may schedule two index generating sub-operations that process in parallel to generate indexes that are subsequently distributed to the query node servers 30. The sub-operations may execute for the generating of a full-index 22 and the generating of the mini-indexes 24. The sub-operations may further execute for the distribution of the indexes to the query node servers 30. The full-index 22 may be a snapshot of the contents of items table 21 in the database 20 and the mini-indexes 24 may respectively correspond to a series of consecutive snapshots where each snapshot captures one or more updates to the items table 21 in the database 20 that occurred within an associated time period of time. The distribution of the full-indexes 22 and the mini-indexes 24 to the query node servers 30 may be over a network utilizing an index distribution module 52 based on Bit Torrent, a peer to peer file sharing protocol. In one embodiment, the scheduler module 48 may schedule the generation of the full-index 22 twice in a twenty-four hour period and the generation of mini-indexes 24 every five minutes. The scheduler module 48 may generate a full-index 22 that is associated with a start-time by scheduling a map-reduce job module 50. The map-reduce job module 50 may initiate a map step that divides the job into smaller sub-jobs (e.g., map tasks) and multiple reduce steps that consume the output from the sub-jobs and aggregates results to generate the index information 26. Similarly, the scheduler module 48 may generate a mini-index 24 by scheduling a map-reduce job module 50 for execution on the HBase/Hadoop Node 49. The generation of the mini-index 24 may include a map step but not, according to one embodiment, a reduce step. Accordingly, each mini-index 24 may be associated with events that arrive from the event queues 38 during a particular period of time and is associated with one or more full-indexes 22. Each index 22, 24 (e.g., full and mini) may include a bill of material (BOM) information which describes the content of the index 22, 24 including the index information 26. The full-index 22 may include full-index BOM information 54 and the mini-index 24 may include mini-index BOM information 56. The index information 26 may include the inverted index 32 and document information 34, as previously described.

At operation E, each of the query node servers 30 may receive the full-index 22 and the associated mini-indexes 24. The query node servers 30 may be comprised of a search grid that is arranged in columns of query node servers 30, as described later in this document. Each column of query node servers 30 may be utilized to manage a range of the documents 16, as previously mentioned. The index information 26 may be stored in memory of the query node servers 30 and in the database 28 connected to the query node servers 30. The index information 26 may be updated with the full-index 22 responsive to its arrival at the query node servers 30. Further, the index information 26 may be updated with the mini-index 24 responsive to its arrival at the query node servers 30. The index information 26 is generally updated in sequential order. For example, the index information 26 are generally updated at the query node server 30 in the order in which the full-index 22 and the mini-indexes 24 are generated. To this end, the full-index 22 may be associated with full-index BOM information 54 the mini-index 24 may be associated with mini-index BOM information 56 that are utilized by the query node server 30 to manage the update of the index information 26. In one embodiment a map-reduce job module 50 may include sub-jobs that execute on the HBase/Hadoop node 49 to generate inverted indices in the form of region sub-indices (not shown) for part of the region associated with the region server (HBase). The sub-jobs may further merge or stitch the multiple region sub-indices together for the region.

At operation F, a second user who operates the client machine 33 may enter a query that may be communicated over a network (e.g., Internet) via front-end servers 58 and back-end servers 60 to be received by the query node servers 30 which may be divided into two layers. The two layers may include an aggregation layer and a query execution layer. The aggregation layer may include a query node server 30 that includes a query engine 62 (e.g. query module) that receives the query that, in turn, communicates the query to multiple query engines 62 that respectively execute in the execution layer in multiple query node servers 30 that correspond to the columns. The query engines 62 in the query execution layer may, in turn, respectively apply the same query, in parallel, against respective the index information 26 that were generated for a range of document identifiers (e.g., column) to identify search results (e.g., document 16) in parallel. Finally, the query engines 62, at each query node server 30 in the query execution layer, may communicate their respective partial search results to the query engine 62 in the aggregation layer which aggregates the multiple sets of partial search results to form a search result for the entire index information 26 and to communicate the search result over the network to the second user.

Figure 2A:
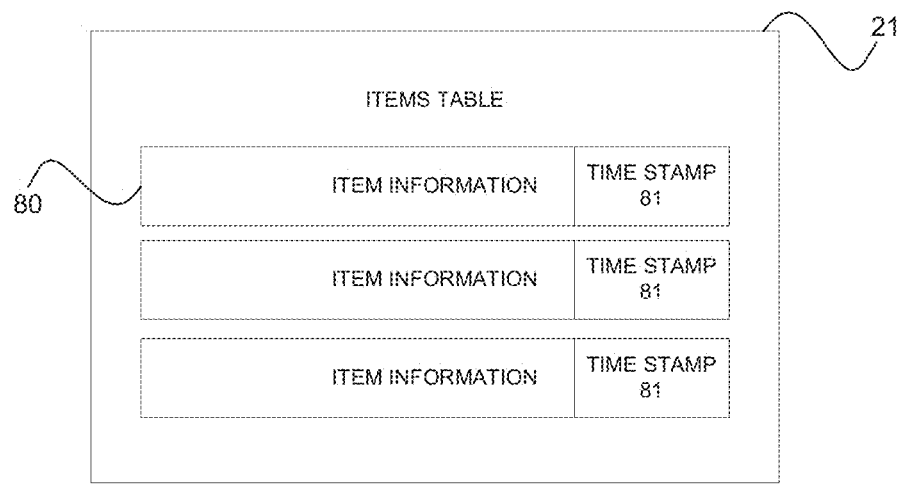
FIG. 2A is a block diagram that illustrates an items table, according to an embodiment.

FIG. 2A is a block diagram that illustrates an items table 21, according to an embodiment. The items table 21 may be stored in a database 20 (shown in FIG. 1) that is time-stamped. The items table 21 may include multiple entries of item information 80. According to one embodiment an entry of item information 80 may be in the form of a document, a listing that describes an item or service that is for sale on a network-based marketplace, or some other unit of information. The item information 80 may be associated with a time-stamp 81. The time-stamp 81 stores a time the item information 80 was most recently added, deleted, or modified.

Figure 2B:
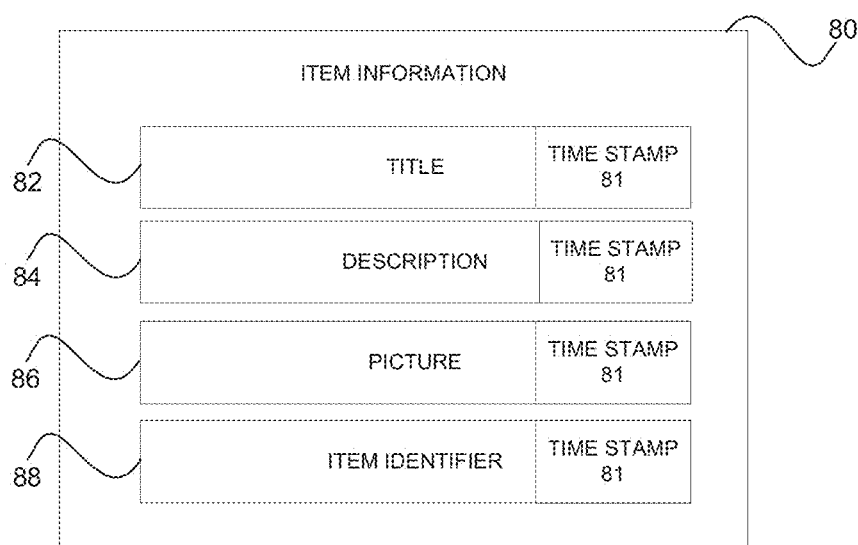
FIG. 2B is a block diagram that illustrates the item information, according to an embodiment.

FIG. 2B is a block diagram that illustrates item information 80, according to an embodiment. The item information 80 may include fields that describe the item (e.g. document, product, service). According to one embodiment the fields may include a title 82 that includes alphanumeric text, a description 84 that includes alphanumeric text, a picture 86 of the item, and an item identifier 88 (e.g., 64 bit) that uniquely identifies the item information 80 from other entries in the items table 21. Each of the fields may be associated with a time-stamp 81. The time-stamp 81 stores a time the field was most recently added, deleted, or modified.

FIG. 3A is a block diagram illustrating an items table 21 in association with regions 90 (e.g. R1-RM), according to an embodiment. The items table 21 may be logically divided into regions 90. Each region 90 is a logical construct that corresponds to a predetermined number of items (e.g., item information 80, documents, etc.) in the items table 21 that utilize a particular range of item identifiers. Segmentation of the items table 21 into regions 90 may facilitate an efficient generation of the index information 26. For example, in one embodiment, the region 90s may be associated map tasks that may be executed with multiple HBase/Hadoop Nodes 49 (e.g., machines) to process the items in the respective regions 90 to generate the index information 26. The number of regions 90 and HBase/Hadoop Nodes 49 may be scaled. In some embodiments, the regions 90 may further be divided into sub-regions that may be associated with sub-tasks that may be utilized to parallel process the items in the region 90.

FIG. 3B is a block diagram illustrating regions 90 in association with a column 98, a column of query node servers 94 and a grid 92 of query node servers 30, according to an embodiment. The grid 92 of servers is comprised of query node servers 30 (e.g., QN) that are arranged in query node columns 94 and query node rows 96. The grid 92 may be utilized to process a query by applying the query to index information 26 (not shown) that is stored at each of the query node servers 30. It may be recalled that each region 90 is a logical construct that corresponds to a predetermined number of items (e.g., item information 80, documents, etc.) that utilize a particular range of item identifiers in the items table 21. FIG. 3B further illustrates, according to an embodiment, the regions 90 (e.g., R1-RM) that respectively correspond to columns 98 (COL-1-COL-N) that respectively correspond query node columns 94. The column 98 is a logical construct that corresponds to a predetermined number of items (e.g., item information 80, documents, etc.) that utilize a particular range of item identifiers in the items table 21. Segmentation of the grid 92 into columns facilitates efficient processing of a query. For example, a query (e.g., Ipod Nano) may be processed by a single query node server 30 in each query node column 94 of the grid 92, in parallel, to generate search results that are subsequently aggregated together to form the search results. The column 98 may be identified with a column identifier. The query node columns 94 and the query node rows 96 may be independently scaled. The query node rows 96 may be increased to maximize throughput in processing a query and decreased to minimize the resources utilized to process the query. The query node columns 94 may be increased to accommodate an increase in the size of the items table 21 and decreased to accommodate a decrease in the size of the items table 21.

FIG. 4 is a block diagram illustrating a time-line 100, according to an embodiment, to generate a full-index 22 and a mini-index 24. The time-line 100 moves from left to right. The down arrows correspond to events associated with the generation and deployment of the full-index 22. The up arrows correspond to events associated with the generation of the mini-index 24.

Full-Index Generation

Callout 102 corresponds to a full snapshot (1) of the items table 21 and callout 104 corresponds to a full deployment of the full snapshot (1). The full snapshot may capture the entire contents of the items table 21 at an instant in time. Further, callout 106 corresponds to a full snapshot (2) that occurs later in time and callout 108 corresponds to a full deployment of the full snapshot (2). The full snapshot (1) and the full snapshot (2) may be utilized to respectively generate the full-index 22 (1) and the full-index 22 (2)

Mini-Index Generation

Callout 102 corresponds to a start-time of a delta snapshot (1) of the items table 21 and callout 110 corresponds to an end-time of the delta snapshot (1). The delta snapshot may capture the changes to the items table 21 that are subsequent to the previous delta snapshot. For example, subsequent to a prior delta snapshot, an entry of item information 80 may be added to the items table, an entry of item information 80 may be removed from the items table 21 or an existing item information 80 entry may be modified. These changes are capture with the delta snapshot. Sequential delta snapshots are illustrated including callout 112 which corresponds to a start-time of a delta snapshot (7) of the items table 21 and callout 114 which corresponds to an end-time of the delta snapshot (7). The successive delta snapshots may be may be utilized to generate the mini-indexes 24 (e.g., mini-index 24 (1), mini-index 24 (2), mini-index 24 (3), etc.)

Update of Index Information with Full Snapshots and Delta Snapshots

The index information 26 at the query node servers 30 may be updated with the full-indexes 22 and the mini-indexes 24 in an order that is sequential. For example, the index information 26 may be updated based on the order in which the full-index 22 and the mini-indexes 24 are generated and communicated to the query node servers 30. Further, the mini-indexes 24 may arrive out of sequence at the query node servers 30. Accordingly, each of the query node servers 30 may utilize current BOM information 64 at the query node servers 30, a full-index BOM information 54 associated with the full-index 22, and the mini-index BOM information 56 associated with the mini-index 24 to ensure the update is performed in sequential order. In some embodiments a delta snapshot may be skipped if explicitly identified. Further, it will be appreciated that the same index information 26 at the query node server 30 may be generated by combining different full and delta snapshots. For example, the index information 26 may be generated based on the full snapshot associated with the full-index 22 (1) and the delta snapshots respectively associated with the mini-indexes 24 (1-9) or the full-index 22 (2) and the delta snapshots respectively associated with the mini-indexes 24 (7-9). Other equivalent combinations may be formed. For example, the index information 26 may be generated based on the full snapshot associated with the full-index 22 (1) and the delta snapshots respectively associated with the mini-indexes 24 (1-10) or the full snapshot associated with the full-index 22 (2) and the delta snapshots respectively associated with the mini-indexes 24 (7-10), etc.

FIG. 5A is a block diagram illustrating index information components 120, according to an embodiment. The index information component 120 is an abstraction that includes the full-index 22 and the mini-index 24.

FIG. 5B is a block diagram illustrating a full-index 22, according to an embodiment. The full-index 22 is based on a snapshot, at an instant in time, of a set of item information 80 which are identified in the items table 21 by a range of item identifiers 88 (e.g., column). The full-index 22 may include full-index BOM information 54 and section information 121. The section information 121 may include primary key information 122, index information 26, and index properties information 128. The index information 26 is an abstraction of the inverted index 32 and document information 34 (e.g., column group information). The document information is a snapshot, at an instant in time, of a set of item information 80 which are identified in the items table 21 by a range of item identifiers 88 (e.g. column). The primary key information 122 may include an item identifier (e.g., 64 bit identifier) for the items in the column 98 and an internal logical item identifier for each of the items in the column 98. The inverted index 32 may include a posting list for the column 98 that utilizes internal logical item identifiers. The document information 34 may include an array of item information 80 for the items in the column 98 that may be accessed according to the internal logical item identifier. The inverted index 32 and the document information 34 may use internal item logical identifiers to identify item information 80 rather than the full 64 bit item identifier to reduce space requirements. The primary key information 122 may be utilized to perform mapping operations. For example, the primary key information 122 may be utilized to map an internal logical item identifier to the corresponding 64 bit item identifier. The reverse operation may also be performed. The index properties information 128 may include statistical information that is gathered while the full-index 22 is being generated.

FIG. 5C is a block diagram illustrating a mini-index 24, according to an embodiment. The mini-index 24 is based on a snapshot of changes, during a period of time, to a set of item information 80 which are identified in the items table 21 by a range of item identifiers 88 (e.g., column). The mini-index 24 may include the mini-index BOM information 54 and section information 121. The section information 121 may include the same sections as the full-index 22 and a delete information 130 section. The document information 34 is a snapshot of changes, during a period of time, to a set of item information 80 which are identified in the items table 21 by a range of item identifiers 88 (e.g. column). The inverted index 32 is a posting list that may enable access to the document information 34, as such. The delete information 130 may describe items (e.g., item information 80) that were deleted subsequent to the generation of the previous mini-index 24.

Figure 6A:
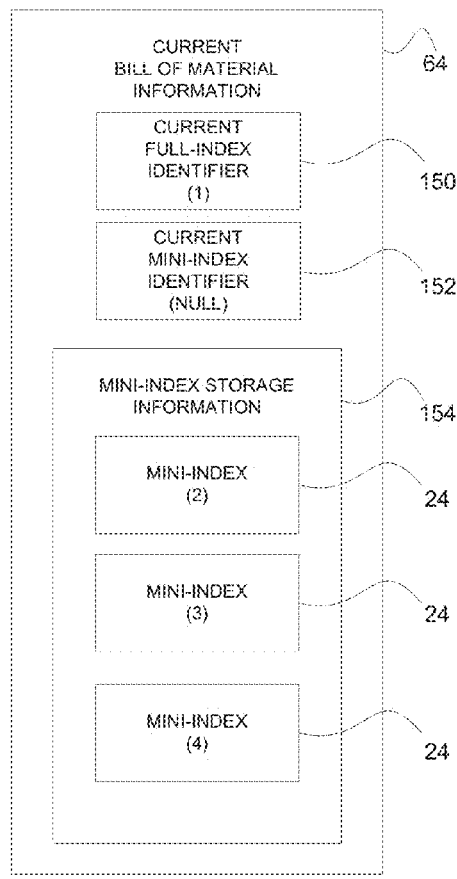
FIG. 6A is a block diagram illustrating current bill of material information, according to an embodiment.

FIG. 6A is a block diagram illustrating current BOM information 64, according to an embodiment. The current BOM information 64 may be stored at a query node server 30 and utilized to manage the updating of the index information 26 with the full-indexes 22 and the mini-indexes 24. The current BOM information 64 may store a current full-index identifier 150 that identifies the most recently updated full-index 22, a current mini-index identifier 152 that identifies the most recently updated mini-index 24 and mini-index storage information 154 that stores mini-indexes 24 that have arrived at the query node server 30 but are not yet merged with the index information 26 presently being utilized by the query node server 30. Generally, as previously described, the index information 26 in the query node server 30 is updated with mini-indexes 24 in sequential order based on the mini-index identifier 162. Mini-indexes 24 that arrive at the query node server 30 may be stored for subsequent merger. For example, the full-index identifier 150 indicates the most recently updated full-index 22 is identified with a full-index identifier 156 of "1." the current mini-index identifier 152 indicates the full-index 22 has not been updated with a mini-index 24 (e.g., NULL), and the mini-index storage information 154 is illustrated as storing mini-indexes 24 "2," "3," and "4" indicating these mini-index 24 have arrived at the query node server 30 out of sequence (e.g., mini-index 24 "1" is missing) and are not yet merged into the index information 26. Accordingly, the arrival of the mini-index 24 with the mini-index identifier 162 of "1" may result in the sequential merger of the set of mini-indexes 24 with mini-index identifiers 162 of "1," "2," "3," and "4."

Figure 6B:
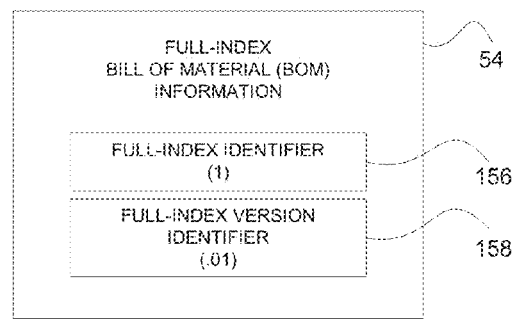
FIG. 6B is a block diagram illustrating full-index bill of material information, according to an embodiment.

FIG. 6B is a block diagram illustrating full-index BOM information 54, according to an embodiment. The full-index BOM information 54 may include a full-index identifier 156 that identifies the full-index 54 and a full-index version identifier 158 that identifies the version of the full-index 54. For example, the full-index identifier 156 is illustrated with a full-index identifier 156 of "1" and a full-index version identifier 158 of "0.01."

Figure 6C:
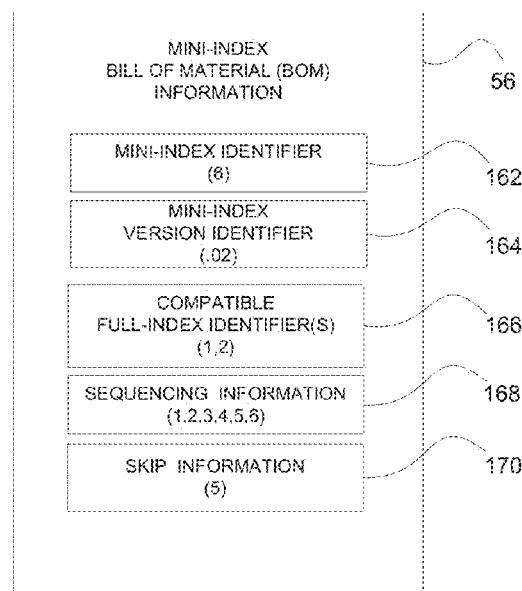
FIG. 6C is a block diagram illustrating mini-index bill of material information, according to an embodiment.

FIG. 6C is a block diagram illustrating mini-index BOM information 160, according to an embodiment. The mini-index BOM information 160 may include a mini-index identifier 162 that identifies the mini-index 24, a mini-index version identifier 164 that identifies the version of the mini-index 24, compatible full-index identifiers 166 that identifies the full-indexes 22 that are compatible with the present mini-index 24, sequencing information 168 that identifies the sequence of mini-indexes 24 that were generated prior to and inclusive of the present mini-index 24 and skip information 170 that identifies mini-indexes 24 that may be skipped. For example, the mini-index identifier 162 is illustrated with a mini-index identifier 162 of "6," a mini-index version identifier 164 of "0.02." compatible full-index identifiers 156 of "1 and 2," sequencing information of "1, 2, 3, 4, 5 and 6" and skip information 170 of "5." Accordingly, the index information 26 in the query node server 30 may be updated with the most recently arrived mini-index 24 (e.g., mini-index "6") provided that the index information 26 was previously updated with the full-index 22 "1 or 2." Further, the index information 26 in the query node server 30 may be updated with the mini-index 24 (e.g., mini-index "6") without updating the index information 26 with the mini-index 24 that is identified with the mini-index identifier 162 of "5" because the skip information 170 identifies the mini-index 24 "5" as being skipped.

Figure 7:
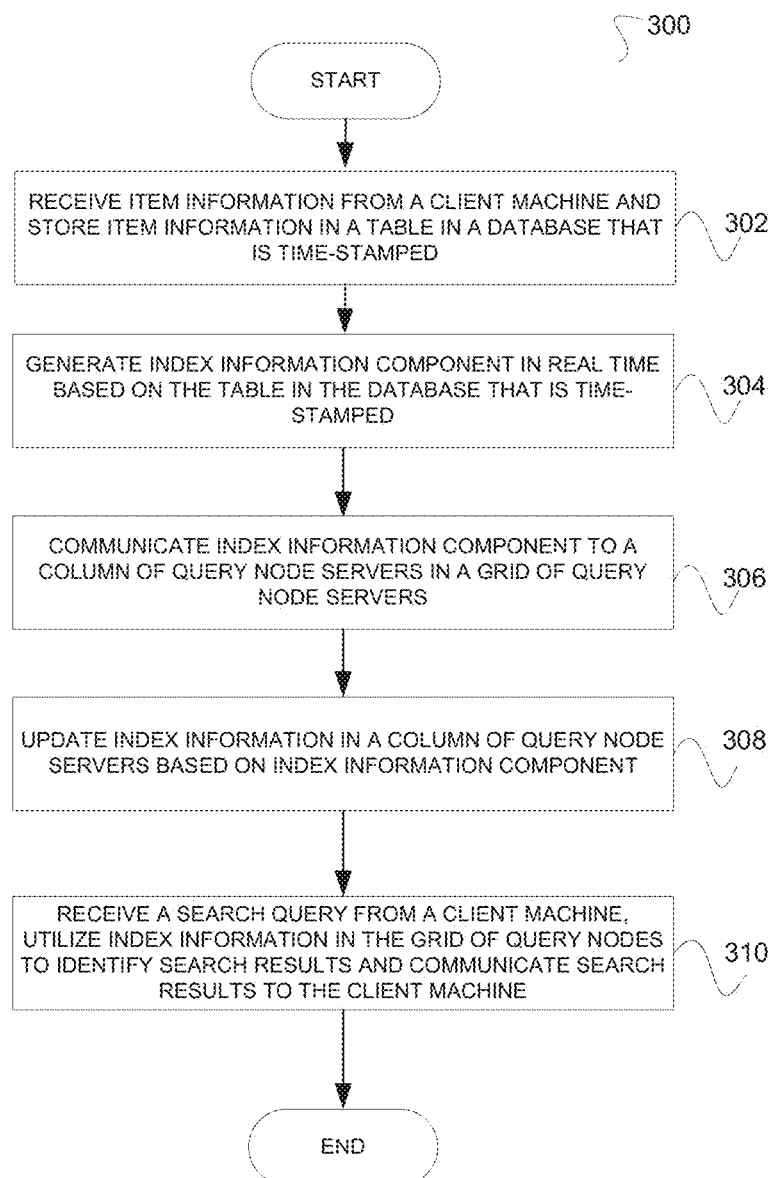
FIG. 7 is a block diagram illustrating a method, according to an embodiment, to build and utilize a search index.

FIG. 7 is a block diagram illustrating a method 300, according to an embodiment, to build and utilize a search index. The method 300 may commence at operation 302 with the information storage and retrieval platform 11 receiving information for an item from a client machine 12. Receipt of the information may cause the HBase master server 42 to add item information 80 (e.g., one entry) to the items table 21. Merely for example, the item information 80 may include a title 82, a description 84, and a picture 86 of a book that is being offered for sale by a seller on the information storage and retrieval platform 11. The item information 80, the title 82, the description 84, and the picture 86 are stored in the items table 21 with a time-stamp that chronicles their respective times of storage.

At operation 304, the HBase/Hadoop Cluster 44 may include a scheduler module 48 that periodically generates/builds the index information components 120 including the full-index 22 or the mini-index 24. The scheduler module 48 may periodically generate the index information component 120 by scheduling a map-reduce job module 50 that initiates jobs that execute in a map-reduce framework. The map-reduce job module 50 may schedule one set of jobs to generate the full-index 22 and another set of jobs to generate the mini-index 24. The building of the full-index 22 and the mini-index 24 may be in real time while the information search and retrieval platform 11 remains operational and in parallel. For example, the scheduler module 48 may schedule the generation of the full-index 22 twice in a twenty-four hour period and the generation of mini-indexes 24 every five minutes. The scheduling and execution of jobs is described more fully in method 400 of FIG. 8A.

At operation 306, the index distribution module 52 may communicate the index information component 120 to the appropriate query node servers 30. For example, the index distribution module 52 may communicate the full-index 22 to the appropriate column 94 of query node servers 30 in the grid 92 of query node servers 30 responsive to the build of the full-index 22 being completed. Also for example, the index distribution module 52 may communicate the mini-index 24 to the appropriate column 94 of query node servers 30 in the grid 92 of query node servers 30 responsive to the build of the mini-index 24 being completed.

At operation 308, the query node servers 30 in the query node column 94 may update the index information 26 responsive to receipt of the index information component 120. The query node server 30 may update the index information 26 with the full-index 22 by restarting the query node server 30, as described more fully in method 450 of FIG. 8B. Also for example, the query node server 30 may update the index information 26 with the mini-index 24 as described more fully in method 470 of FIG. 8C.

At operation 310, the information storage and retrieval platform 11 may receive a search query, over a network, from a client machine 33 and utilize the index information 26 in the grid 92 of query node servers 30 to identify search results that are communicated back to the client machine 33.

Figure 8A:
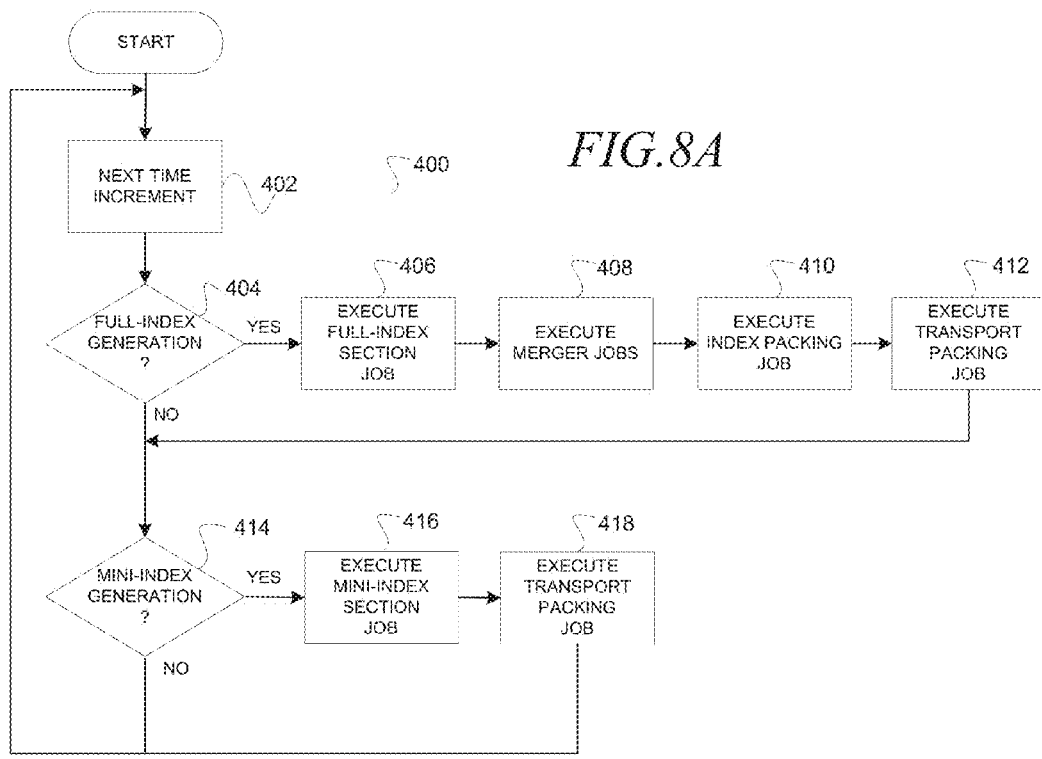
FIG. 8A is a block diagram illustrating a method to generate index information components, according to an embodiment.

FIG. 8A is a block diagram illustrating a method 400, according to an embodiment, to generate an index information component 120. The method 400 may execute in a loop without end. The method 400 may commence at operation 402 with the scheduler module 48 identifying commencement of the next time increment and initiating execution of the map-reduce job module 50. At decision operation 404, the map-reduce job module 50 may identify whether a full-index 22 is scheduled for generation/build. If a full-index 22 is scheduled for generation/build then the map-reduce job module 50 may sequentially execute the full index section job (operation 406), the merger job (operation 408), the index packing job (operation 410) and the transport packing job (operation 412). The respective jobs may generate output that is consumed by the next job in the sequence until the transport packing job communicates the full-index 22 to the appropriate query node column 94 of query node servers 30 in the grid 92 of query node servers 30. The execution of jobs is described more fully a data flow 550 of FIG. 9A.

At decision operation 414, the map-reduce job module 50 may identify whether a mini-index 24 is scheduled for generation/build. If a mini-index 24 is scheduled for generation/build then the map-reduce job module 50 may sequentially execute the mini-index section job (operation 416) and the transport packing job (operation 412). The transport packing job may communicate the mini-index 24 to the appropriate query node column 94 of query node servers 30 in the grid 92 of query node servers 30. The execution of jobs is described more fully in a data flow 570 of FIG. 9B.

Figure 8B:
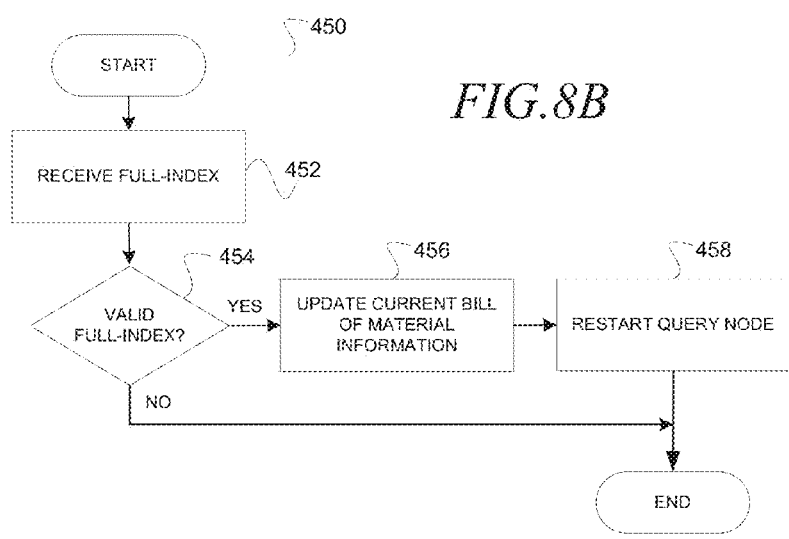
FIG. 8B is a block diagram illustrating a method to update index information based on a full-index, according to an embodiment.

FIG. 8B is a block diagram illustrating a method 450 to update index information 26 at a query node server 30 based on a full-index 22, according to an embodiment. The method commences at operation 453 with the query engine 62, at the query node server 30, receiving the full-index 22. At operation 454 the query engine 62 may identify whether the full-index 22 is valid (e.g. well formed). Recall that the full-index 22 may include full-index BOM information 54 that includes a full-index identifier 156 and a full-index version identifier 158. If the query engine 62 identifies the full-index identifier 156 is the same as the current full-index identifier 150 then the full-index 22 may be identified as not valid (e.g., the full index is already installed). Further, if the query engine 62 identifies the full-index version identifier 158 is not within a predetermined range then the full-index 22 may be identified as not valid (e.g., the full-index version identifier 158 is not well formed). If the full-index 22 is identified as not valid then processing ends. Otherwise processing continues at operation 456. At operation 456, the query engine 62 may update the current full-index identifier 150 in the BOM information 64 with the full-index identifier 156 in the full-index BOM information 54. At operation 458, the query engine 62 may restart the query node server 30 to identify and initialize the index information 26 in the query node server 30 with the full-index 22. For example, the query node server 30 may utilize the full-index identifier 156 in the full-index BOM information 54 to identify the appropriate full-index 22.

Figure 8C:
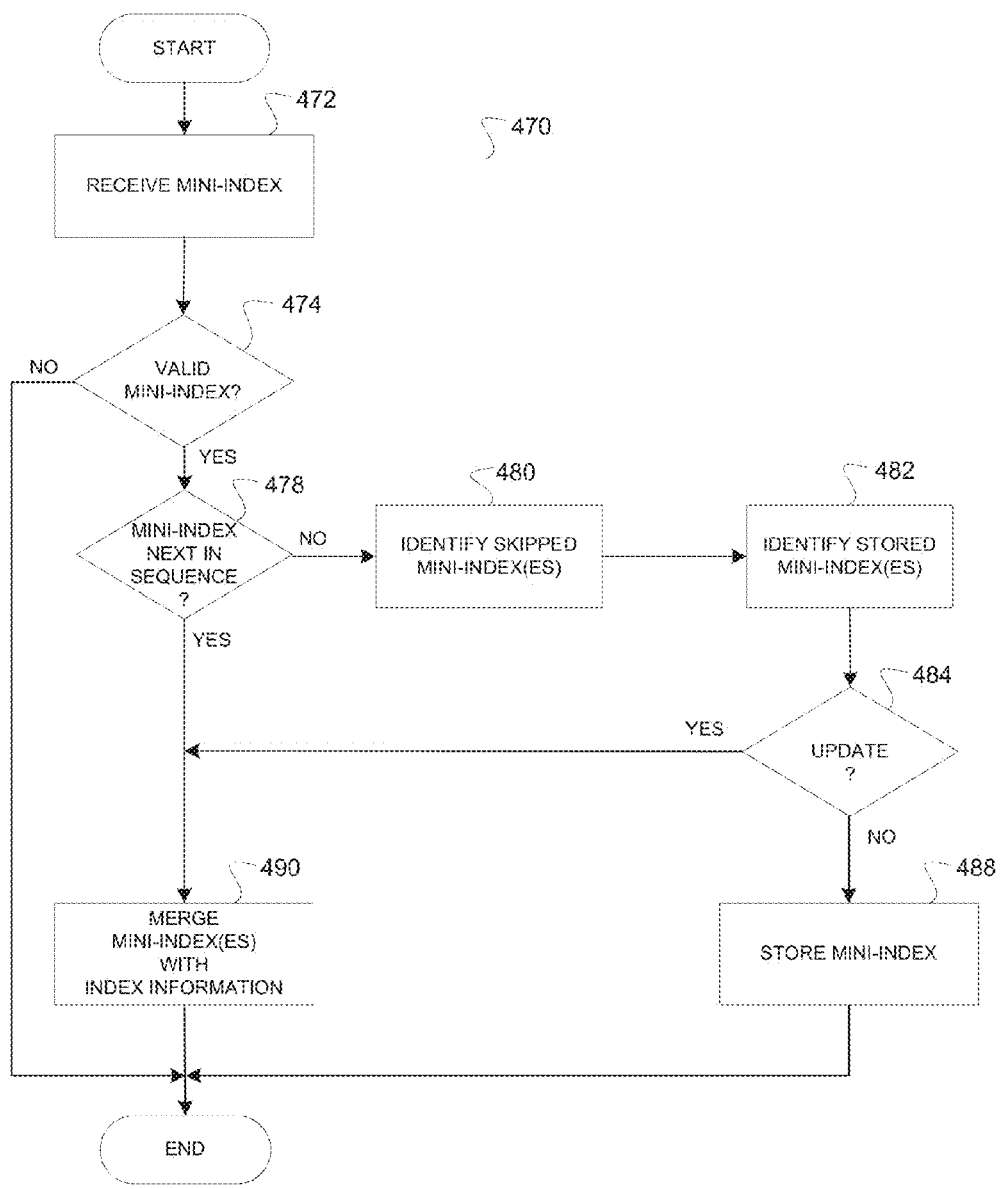
FIG. 8C is a block diagram illustrating a method to update index information based on a mini-index, according to an embodiment.

FIG. 8C is a block diagram illustrating a method 470 to update index information 26 in a query node server 30 based on a mini-index 24, according to an embodiment. The method may commence at operation 472 with the query engine 62, at the query node server 30, receiving the mini-index 24. At decision operation 474 the query engine 62 may identify whether the min-index 24 is valid. For example, if the query engine 62 identifies the mini-index identifier 162 is the same as the current mini-index identifier 152 then the mini-index 24 may be identified as not valid (e.g., the mini-index 24 is already merged into the index information 26). Further, if the query engine 62 identifies the mini-index version identifier(s) 164 is not within a predetermined range then then the mini-index 24 may be identified as not valid (e.g., the mini-index version identifier 164 is not well formed). Further, if the query engine 62 identifies the compatible full-index identifier 166 does not include at least one full-index identifier 156 that matches the current-full index identifier 150 then the mini-index 24 may be identified as not valid (e.g., the mini-index 24 is not compatible with the full-index 22 utilized to build the index information 26 in the query node server 30).

At decision operation 478, the query engine 62 may identify whether the received mini-index 24 is identified with a mini-index identifier 162 that identifies the next expected mini-index 24. For example, the query engine 62 may identify whether the mini-index identifier 162 in the mini-index BOM information 56 is equal to the current mini-index identifier 152 plus 1. If the received mini-index 24 is the next in sequence then processing continues at operation 490. Otherwise processing continues at operation 480. At operation 480, the query engine 62 may identify whether mini-indexes 24 may be skipped. For example, the query engine may read the skip-information 170 in the mini-index BOM information 56 included in the mini-index 24. At operation 482, the query engine 62 may identify whether any mini-indexes 24 have been stored as mini-index storage information 154. At decision operation 484, the query engine 62 may determine whether the update of the index information 26 in the query node server 30 may be performed based on the skip information 170 and the identified stored mini-indexes 24. If the update may be performed then processing continues at operation 490. Otherwise processing continues at operation 488. At operation 488, the query engine 62 may store the mini-index 24 that was most recently received as mini-index storage information 154. At operation 490, the query engine 62 may update in sequential order the index information 26 in the query node server 30 with the mini-indexes 24 that were identified. For example, the query engine 62 may sequentially update the index information 26 with the one or more mini-indexes 24 identified as stored as mini-index storage information 154 and the mini-index 24 that was most recently received while skipping any mini-indexes that were identified in the skip information 170.

Figure 9A:
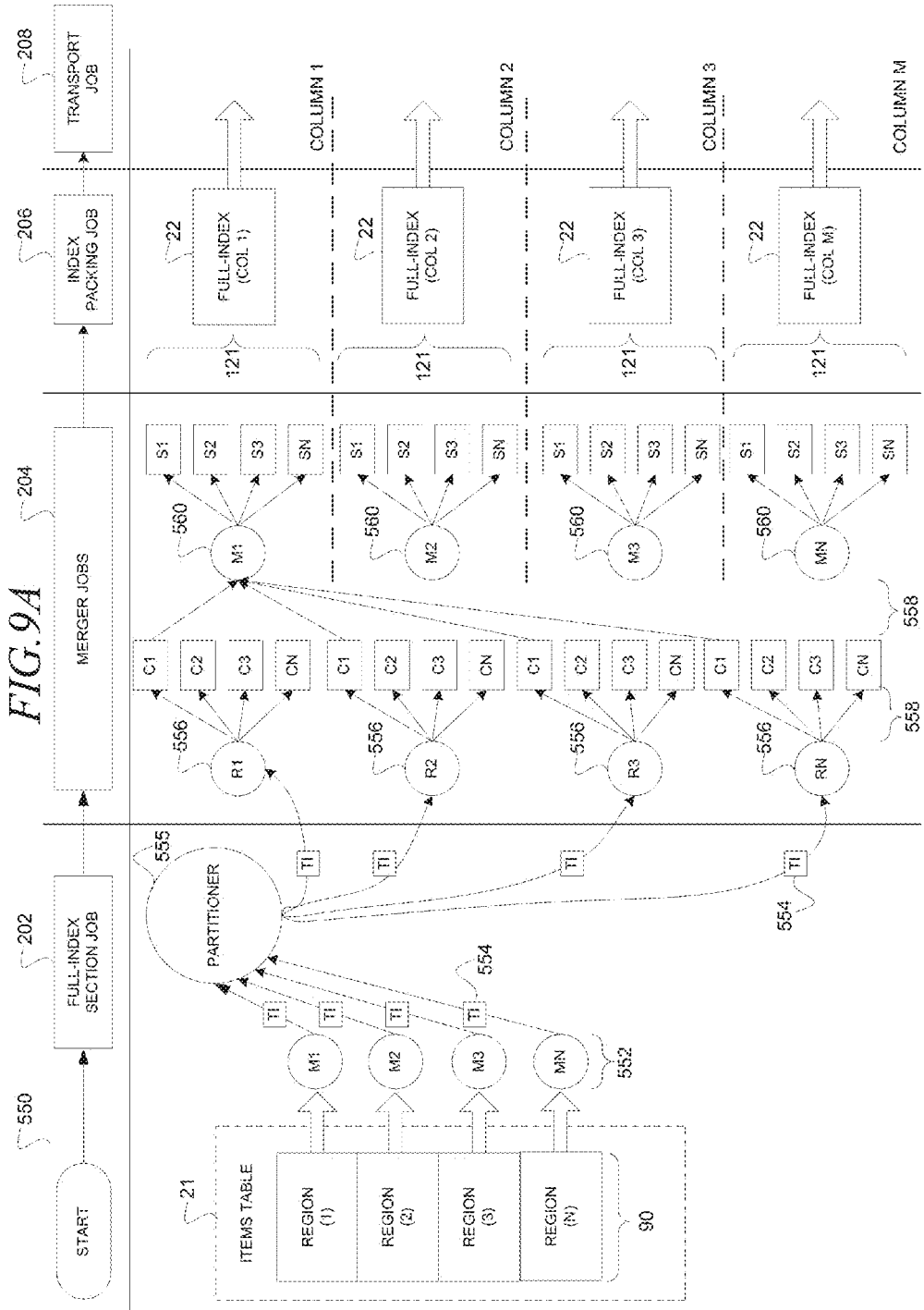
FIG. 9A is a block diagram illustrating a data flow, according to an embodiment, to generate a full-index.

FIG. 9A is a block diagram illustrating the data flow 550, according to an embodiment, to generate a full-index 22. The data flow 550 moves from left to right, chronologically, as directed by a scheduler module 48 (not shown). The scheduler module 48 may periodically initiate the map-reduce job module 50 that causes the execution of a set of jobs illustrated on the top of the data flow 550. The set of jobs may include a full-index section job 202, merger jobs 204, an index packing job 206 and a transport job 208. The full-index section job 202 and the merger jobs 204 are components of a map-reduce framework, as known in the art.

The full-index section job 202 may initiate map tasks 552 (e.g., M1, M2, M3, MN), one for each of the regions 90 of the items table 21, as previously described. The map tasks 552 may take full snapshots of the item information 80 corresponding to item identifiers 88 in the associated region 90. To this end, the map tasks 552 may read item information 80 (e.g., describing items) from the items table 21, according to regions 90, and generate token information 554 and other information both being utilized to generate the section information 121. The other information may be communicated directly to the reducers 556 (e.g., "R1," "R2," "R3," "RN"). The token information 554 may be communicated to a partitioned 555 which, in turn, partitions the token information 554 for consumption by reducers 556 (e.g., "R1," "R2," "R3," "RN"). The partitioner 555 may partition the token information 554 (not shown) based on the contents of the token information 554 including a token element 211 (not shown), an item identifier 88, and the column identifier. For example, token information 210 may be embodied as follows:

"'cat,' item 100, column 1."

Responsive to receiving the token information 210, the partitioner 555 may identify a particular reducer 556 (e.g., "R1," "R2," "R3," "RN") based on a hash value that is generated from the token element 211 and the column identifier and send the token information 210 to the identified reducer 556. The merger jobs 204 may initiate the reducers 556 and map tasks 560 to process the token information 554 and other information to generate the full-index 22. The reducers 556 and map tasks 560 may execute on the HBase/Hadoop nodes 49. It will be appreciated that processing time to produce the full-index 22 may be minimized by increasing the number of map tasks 552, reducers 556, map tasks 560 and HBase/Hadoop nodes 49. Further, resources may be economized by decreasing the same. Each of the reducers 556 may segregate the received token information 554 according to columns 98 (e.g., "COLUMN 1," "COLUMN 2," "COLUMN 3," COLUMN N). For example, the token information 554 and other information for "Column 1" may be segregated as output 558 for "COLUMN 1." Other output 558 may be segregated for other columns 98 in a similar manner. Recall that the columns 98 may correspond to a query node column 94 of query node servers 30 in a grid 92 of query node servers 30 (not shown)) that utilize the full-index 22, once generated, to process a query. The reducers 556 may organize the token information 554 and other information into output 558 according to columns 98 based on column identifiers and distributes the output 558 in accordance with the columns 98 to the map tasks 560. For example, FIG. 7A illustrates the reducer 556 identified as "R1" as receiving the token information 554 for all columns 98, generating output 558 that is organized according to the columns "C1," "C2," "C3," "CN" and distributing the output 558 for "C1" to the map task 560 "M1." For clarity sake the other output 558 (e.g., "C2," "C3," and "CN") is not illustrated as being distributed to the other map tasks 560 (e.g., "M1," "M2," "M3," and "MN"). Further, the remaining reducers 556 (e.g., "R2," "R3," and "RN") are also illustrated as distributing the output 558 for "C1" to the map task 560 "R1" but again, for clarity sake, the full data flow is not illustrated. Broadly, each reducer 556 may generate output 558 for all columns 98 and distributes the output 558 to the map tasks, according to columns 98.

The map task 560 may receive the output 558 for a single column 98. The map task 560 may utilize the output 558 and the other information to generate the section information 121 (e.g., "S1," "S2," "S3," and "SN") for the particular column 98.

The index packing job 206 may execute to generate the full index 22. The index packing job 206 may generate the full index 22 by packing the sections of the section information 121 together, generating the full-index BOM information 54, and packing the full-index 22. The index packing job 206 may pack the full-index by packing the section information 121, the full-index BOM information 54 and the index properties information 128 into the full-index 22.

Finally, the transport job 208 may execute to distribute the full-indexes 22, according to columns 94, to the grid 92 of query node servers 30. For example, the transport job 208 may execute to transport the full-index 22 for column 1 to each of the query node servers 30 in column 1 of the grid 92. In one embodiment, the distribution of the full-indexes 22 to the query node servers 30 may be over a network utilizing the index distribution module 52 based on Bit Torrent, a peer to peer file sharing protocol.

Figure 9B:
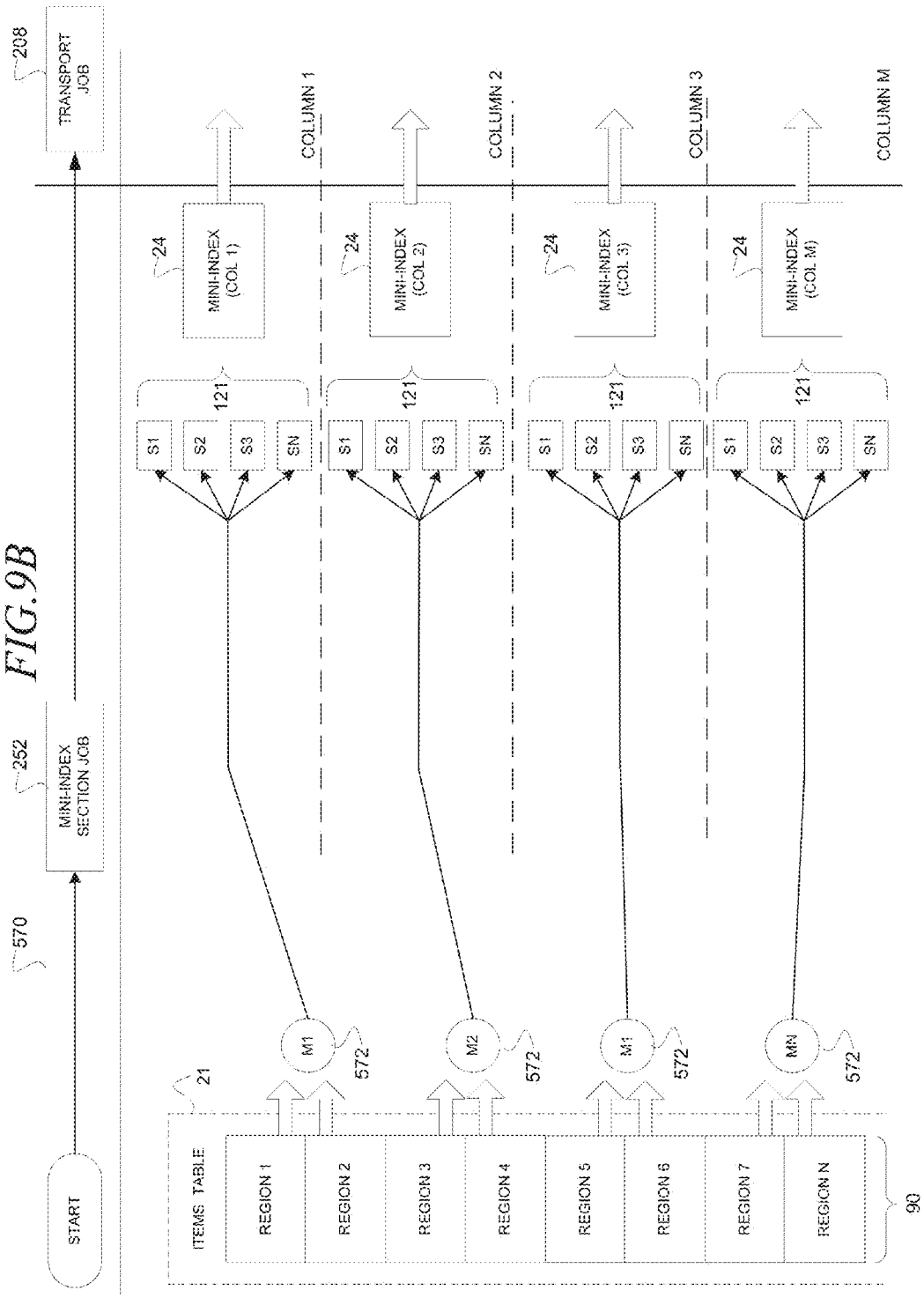
FIG. 9B is a block diagram illustrating a data flow to generate a mini-index, according to an embodiment.

FIG. 9B is a block diagram illustrating the data flow 570 to generate a mini-index 24, according to an embodiment. The data flow 250 moves from left to right, chronologically, as directed by a scheduler module 48 that initiates execution of the map-reduce job module 50 that initiates execution of a mini-index section job 252 and a transport job 208. The mini-index section job 252 is a component of a map-reduce framework as is known in the art.

The mini-index section job 252 may initiate map tasks 572 (e.g., "M1," "M2," "M3," and "MN"), one for each column 98. The map tasks 572 may further correspond to two regions 90 of the items table 21, according to an embodiment. Other embodiments may utilize a different ratio of regions 90 to columns 94 to map tasks 552. The map tasks 552 may take a snapshot of changes to the items table 21 that have occurred between a start-time and an end-time. For example, the snapshot may record an addition of item information 80 (e.g., new item), a deletion of item information 80, and a modification to existing item information 80 (e.g., field addition, field addition, field modification). The map tasks 552 may further generate the mini-index 24. The map tasks 552 may generate the mini-index 24 by packing the sections of the section information 121 together, generating the mini-index BOM information 56, and packing the mini-index 24. The map tasks 552 may pack the mini-index 24 by packing the section information 121, the mini-index BOM information 56 and the index properties information 128 into the mini-index 24.

The transport job 208 may execute to distribute the mini-indexes 24, according to columns 98, to the query node column 94 in the grid 92 of query node servers 30. For example, the transport job 208 may execute to transport the mini-index 24 for column 1 to the query node servers 30 (not shown) in column 1 of the grid 92 (not shown). In one embodiment, the distribution of the mini-indexes 24 to the query node servers 30 may be over a network utilizing the index distribution module 52 based on Bit Torrent, a peer to peer file sharing protocol.

Figure 10A:
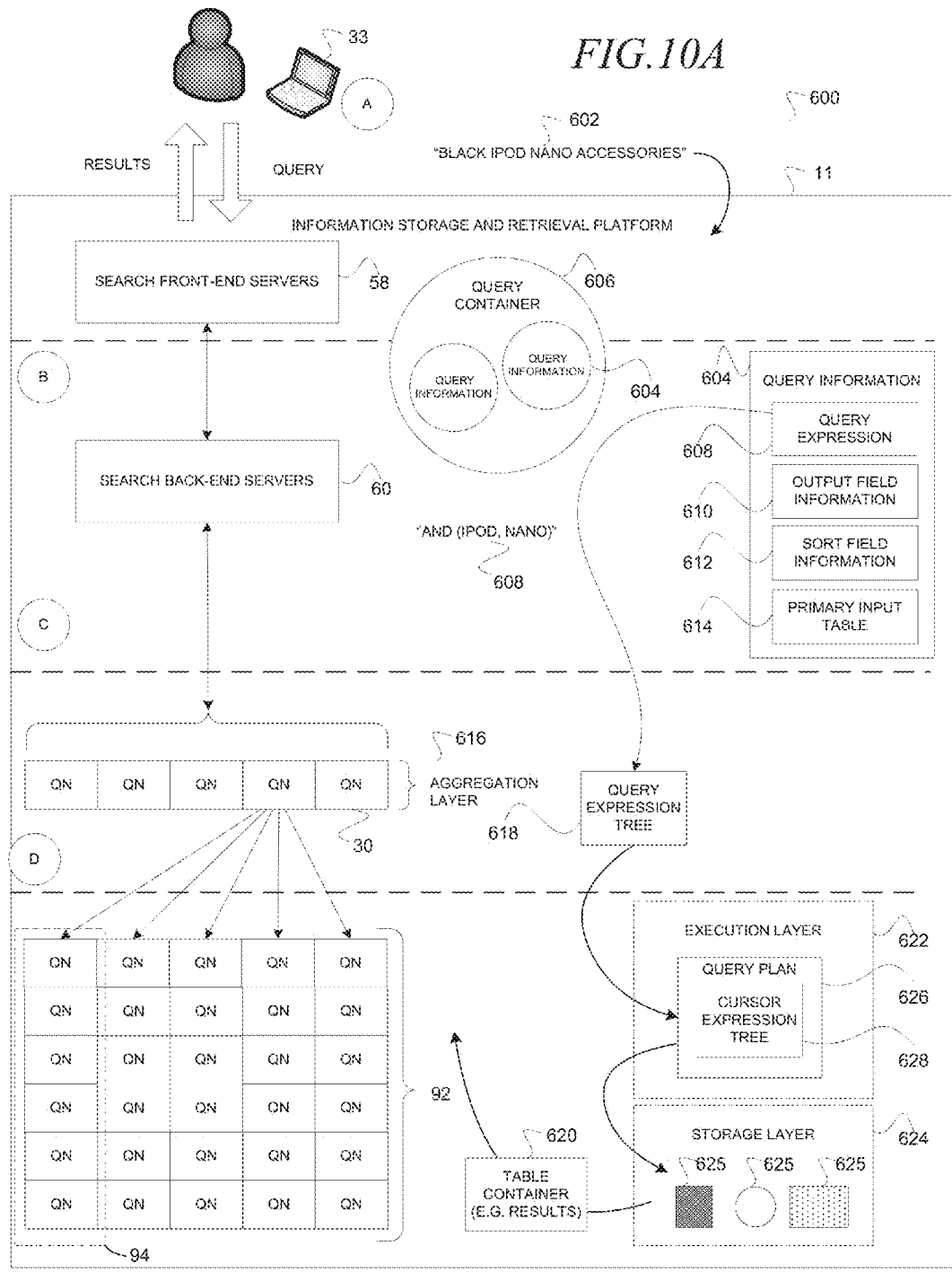
FIG. 10A is a network diagram illustrating a system, according to an embodiment, to process a query with a unified storage interface.

FIG. 10A is a network diagram illustrating a system 600, according to an embodiment, to process a query 602 with a unified storage interface. The system 600 may embody the system 10 in FIG. 1 and, accordingly, the same or similar references have been used to indicate the same or similar features unless otherwise indicated. The system 600 may include a client machine 33 and an information storage and retrieval platform 11. Broadly, the information storage and retrieval platform 11 may receive the query 11, over a network (e.g., Internet)(not shown) from the client machine 33, generate a query container 606 that includes a query expression 604 that is based on the query 602, and process the query expression 604 in an execution layer 622 and storage layer 624 that utilize a unified storage interface to retrieve data from heterogeneous storage devices 625 (e.g., box, circle, rectangle) and communicate at least a portion of the data back over the network to the client machine 33. The unified storage interface hides interactions that are unique to the respective storage device 625. For example, the unified storage interface may be embodied as an application programming interface that is utilized to retrieve data from the different storage device 625. For example, the storage devices 625 may differ with respect to instructions utilized to retrieve the data, format in which the data is stored, format in which the data is retrieved, and location of the storage device 625 (e.g., local or remote). Examples of heterogeneous storage devices 625 may include a relational database that stores relational data as tuples, a directed acyclic word graph (DAWG) database that stores data as a set of strings arranged as a hierarchy of nodes connected by edges that may be traced without forming a loop and the same two databases being accessed remotely over a network. The unified storage interface may be accessed in the execution layer 622 which is common for all storage types to enter the storage layer 625 that is organized according to storage type. Accordingly, operations unique to a particular storage device 625 are contained inside the storage layer 624 which is accessed via the execution layer 622 that, in turn, provides a generalized service to access all storage devices 625 for query processing clients (e.g., query engine 62). One benefit of decoupling the generalized operations from the storage device 625 specific operations is to simplify software development. For example, software that executes in the execution layer 622 may be modified independently of software that executes in the storage layer 624 minimizing engineering resources to achieve interoperability and integration. The system 600 is now discussed more fully in detail.

At operation A, the information storage and retrieval platform 11 may utilize search front-end servers 58 to receive the query 602 from the client machine 33. For example, the query may include the keywords "BLACK IPOD NANO ACCESSORIES." The search front-end servers 58 may parse the query 602 to generate query information 604 and store the query information 604 in a query container 606. The query container 606 may contain multiple entries of query information 604, some being parsed from the same query 602 "BLACK IPOD NANO ACCESSORIES" and others being parsed from other queries (not shown). The query information 604 that is illustrated is for the query expression 608 "AND (IPOD, NANO)" being parsed from the example query, "BLACK IPOD NANO ACCESSORIES." Other query information 604 is not illustrated. The query information 604 may include the query expression 608, output field information 610, sort field information 612 and a primary input table 614. The query expression 608, as described above, may be comprised of keywords that are parsed by the front-end server 58 from the query 602 that is received and operators that either appear in the query 602 or are implied as being in the query 602. The output field information 610 may identify output fields to be included the search results. For example, the output field information 610 may identify one or more fields of records (e.g., items, documents) that are included in the search results. The sort field information 612 may identify the one or more field(s) utilized to sort the search results and whether to sort in ascending or descending order. The primary input table 614 may identify an input table from which data is retrieved based on the query expression 608. At least a portion of the data may be returned to the client machine 33 as search results.

At operation B, the search front-end servers 58 may communicate the query container 606 to the search back-end servers 60. The search back-end servers 60 may process the query information 604 in the query container 606, as described later in this document.

At operation C, the search back-end servers 60 may communicate the query container 606 to a query node server 30 in an aggregation layer 616 of query node servers 30. The query node server 30 may respond to receipt of the query container 606 by invoking a query engine 62 (not shown) to generate a query expression tree 618 based on the query expression 608 and store the query expression tree 618 in the query container 606. Further, the query engine 62 may identify a single query node server 30 in each of the query node columns 94 of the grid 92 of query node servers 30 and communicate the query container 606 to the identified query node servers 30. Further, recall that each of the query node columns 94 is dedicated to a particular range of documents (e.g., items) in the index information 19. Accordingly, the query node server 30 in the aggregation layer 616 communicates the query container 606 to one query node server 30 in each of the query node columns 94 in the grid 92 to retrieve search results for the entire index information 19.

At operation D, the query node servers 30 in respective query node columns 94 may receive the query container 606 and process the query information 604 entries in the query container 606. For example, the query node server 30 may process each query information 604 entry to build (e.g. generate) and execute a query plan 626. To this end, one query engine 62 from each query node column 94 invokes a query plan builder 654 to build the query plan 626 and further executes the query plan 626. The query plan 626 may include a cursor expression tree 628 that include expression nodes (not shown) that correspond to cursor objects of the query expression tree 618 (not shown). The query plan builder 654 may invoke expansion generators (not shown) that read the expression nodes of the query expression tree 618 to generate the cursor objects of the cursor expression tree 628. The expansion generators may include a generic expansion generator (not shown) that executes in the execution layer 622 to generate cursor objects and multiple specific expansion generators (not shown) that execute in the storage layer to generate storage cursor objects. The expression nodes directly correspond to the cursor objects (e.g., one-to-one correspondence).

The query engine 62 executes the query plan 626. For example, the query engine 62 may execute cursor objects (not shown) and storage cursor objects (not shown) in the query plan 626. The query engine 62 may execute the storage cursor objects to retrieve data from a particular storage device 625. The query node server 30 may store the data that was retrieved in a table container 620 that may subsequently be communicated as search results via the aggregation layer 616 to the search back-end servers 60 to the search front-end servers 58 to the client machine 33. Accordingly, operations that are unique to a particular storage device 625 are hidden within a storage layer that is accessible via an execution layer that is exposed to query processing clients (e.g., query engine 62) resulting in a unified storage interface.

Figure 10B:
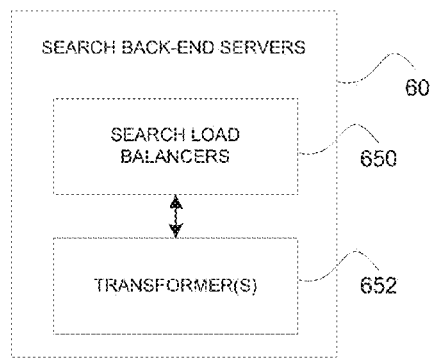
FIG. 10B is a block diagram illustrating search back-end servers, according to an embodiment.

FIG. 10B is a block diagram illustrating search back-end servers 60, according to an embodiment. The search back-end servers 60 may include search load balancers 650 and transformers 652. The search load balancers 650 may receive the query container 606 (not shown) from the search front-end servers 58 and communicate the query container 606 (not shown) to a transformer 652 to balance traffic. For example, the search load balancer 650 may communicate the query container 606 to the transformer 652 that is the least loaded. The transformer 652 performs an expansion function and a scatter/gather function for each of the query information 604 in the query container 606. The expansion function expands the terms of the query expression 608 to widen the scope of the search result. For example, the query expression 608 "AND (IPOD, NANO)" may be expanded to capture plural forms as follows "AND ((IPOD OR IPODS), NANO)." Other types of expansions may also be performed to capture synonyms, idioms, etc. Further, the transformer 652 may perform the scatter/gather function by iterating the search of the query expression 608. For example, consider a database of item information 80 describing multiple items that are for sale on a network-based marketplace with an auction process and/or purchase process. A buyer who enters a search query may be interested in receiving search results that include matching item information 80 for both formats. Accordingly, the transformer 652 may generate the desired search result by initiating two searches in parallel. The first search may be for items that are offered for sale with an auction process. The second search may be for items that are offered for sale with a purchase process. Each of the searches would proceed as previously described in operation "C" of FIG. 10A. Further, the transformer 652 may receive and blend the results of the two searches. For example, the transformer may receive the search results (e.g., item information 80) of the first search in a first table container 620 (e.g. auction process) and the search results of the second search in a second table container 620 (e.g., auction process) and blend the two search results in a third table container 620 that is returned via the search front-end servers 58 to the client machine 33. The blending to form the third table container 620 may be according to a predetermined percentage, according to one embodiment. For example, the third table container 620 may be comprised of twenty-percent of the item information 80 in the first table container 620 (e.g., auction process) and eighty-percent of the item information 80 in the second table container 620 (e.g., purchase process).

Figure 10C:
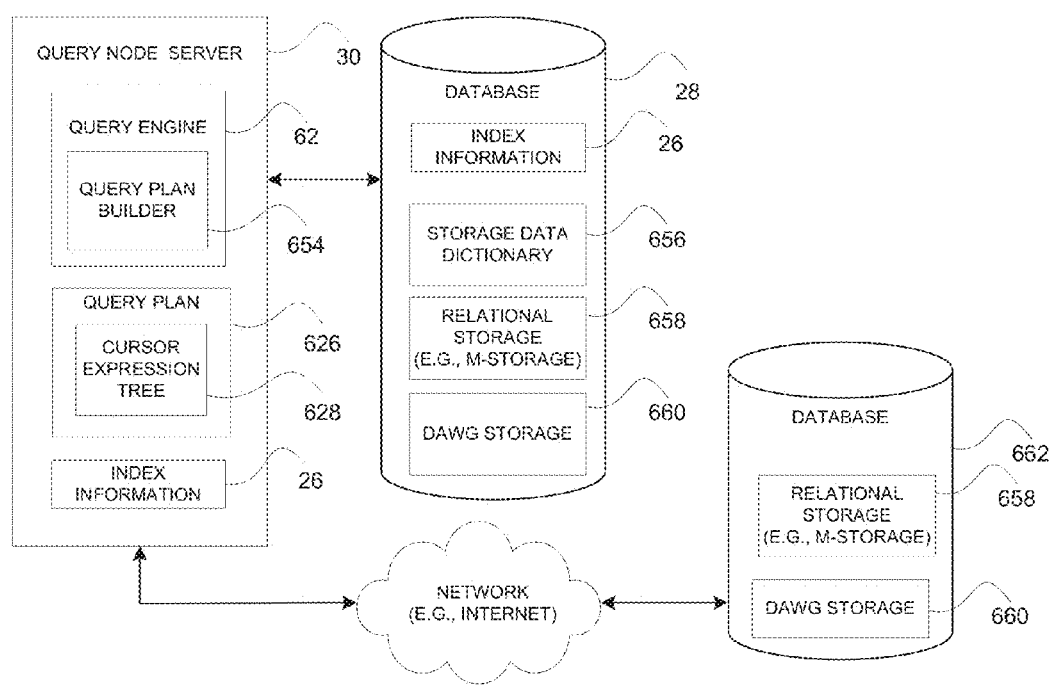
FIG. 10C is a block diagram illustrating a query node server, according to an embodiment.

FIG. 10C is a block diagram illustrating a query node server 30, according to an embodiment. The query node server 30 may include a query engine 62 that executes a query plan builder 654 to build the query plan 626 and execute the query plan 626, as previously described. The query node server 30 may store index information 26, as previously described. Further, the query node server 30 may be coupled to a database 28 that is local and over a network (e.g., Internet) to a database 662 that is remote. The database 28 that is local may store the index information 26, a storage data dictionary 656, relational storage 658 (e.g., M-storage), and directed acyclic word graph (DAWG) storage 660. The data dictionary 656 may be utilized by the query plan builder 654 to identify the appropriate specific expansion generator based on the primary input table 614 in the query information 604. The relational storage 658 may be utilized to store data in a relational format. A relation is defined as a set of tuples that have the same attributes. A tuple represents an object and information about that object. Objects are typically physical objects or concepts. A relation is usually described as a table, which is organized into rows and columns. The DAWG storage 660 database stores data as a set of strings arranged as a hierarchy of nodes connected by edges that may be traced without forming a loop. The database 662 may be accessed over a network (e.g., Internet) and may also may store relational storage 658 and DAWG storage 664. Accordingly, the query node server 30 may provide access to four storage devices including the relational storage 658 (e.g., M-storage) accessed via the database 28 that is local, the DAWG storage 660 accessed via the database 28 that is local, the relational storage 658 (e.g., M-storage) accessed over the network via the database 662 that is remote, and the DAWG storage 660 accessed over the network via the database 662 that is remote.

Figure 10D:
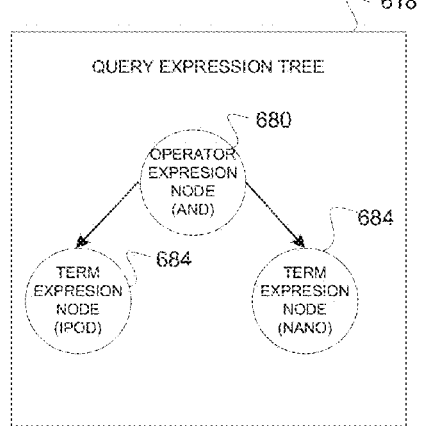
FIG. 10D is a block diagram illustrating a query expression tree, according to an embodiment.

FIG. 10D is a block diagram illustrating a query expression tree 618, according to an embodiment. The query expression tree 618 may include expression nodes including an operator expression node 680 and a term expression node 684. The operator expression node 680 may be utilized to represent operators (e.g., AND) that are identified in the query expression 608 (not shown). The term expression node 684 may be utilized to represent terms (e.g., IPOD, NANO) that were identified in the query expression 608.

Figure 10E:
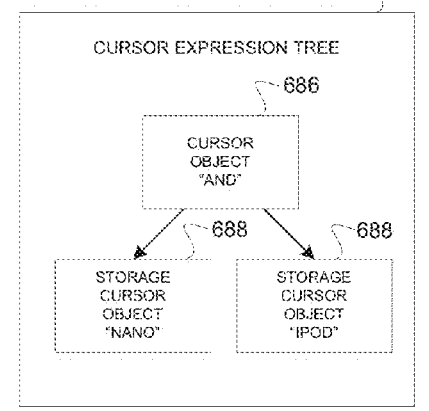
FIG. 10E is a block diagram illustrating a cursor expression tree, according to an embodiment.

FIG. 10E is a block diagram illustrating a cursor expression tree 628, according to an embodiment. The cursor expression tree 628 may include software components in the form of cursor objects. The cursor objects may be executed by the query engine 62 to retrieve data from a data storage device 625. A cursor is a moving placement or pointer that indicates a position. In the present example the notion of the cursor may correspond to a particular record in a database (e.g., relational storage, DAWG storage, etc.). The cursor expression tree 628 may include cursor objects 686 and storage cursor objects 688. The cursor object 686 may correspond to an operator expression node 680 (e.g., AND) in the query expression tree 618. The storage cursor object 688 may correspond to a term expression node 684 (e.g., IPOD, NANO) in the query expression tree 618.

Figure 10F:
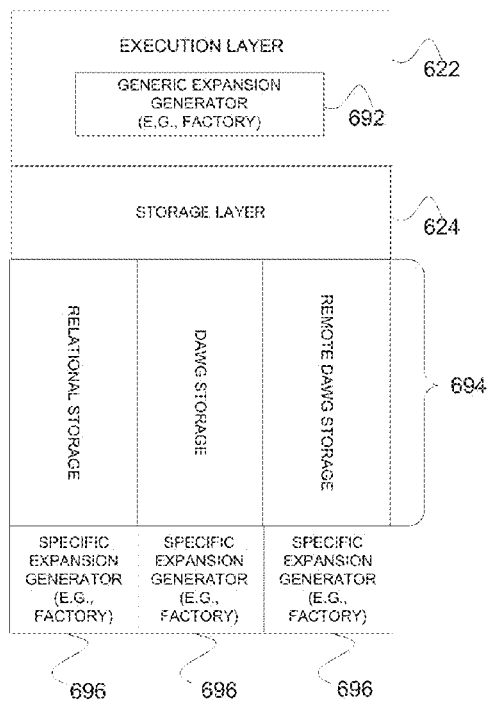
FIG. 10F is a block diagram illustrating software layers, according to an embodiment.

FIG. 10F is a block diagram illustrating software layers 690, according to an embodiment. The software layers 690 may include an execution layer 622 and a storage layer 624. The execution layer 622 may include a generic expansion generator 692 (e.g., factory) that is utilized to generate cursor objects for the cursor expression tree 628. For example, the generic expansion generator 692 may generate a cursor object 686 that corresponds to an operator expression node 680 in the query expression tree 618. The storage layer 624 may include storage sub-layers 694 that correspond to types of data storage devices 625. The storage sub-layers 694 may include DAWG storage that is remote, DAWG storage that is local, relational storage that is remote, relational storage that is local and other types of storage. Associated with each storage sub-layer 694 is a specific expansion generator 696 (e.g., factory) that is utilized to generate storage cursor objects 688 for the cursor expression tree 628. For example, the specific expansion generator 696 may generate a cursor storage object that corresponds to a term expression node 684 in the query expression tree 618.

Figure 10G:
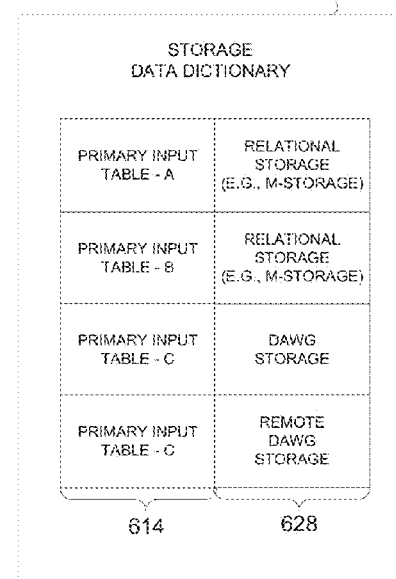
FIG. 10G is a block diagram illustrating a storage data dictionary, according to an embodiment.

FIG. 10G is a block diagram illustrating a storage data dictionary 698, according to an embodiment. The storage data dictionary 698 may be used to associate the primary input table 614 in the query information 604 with a storage sub-layer 694 that is associated with a specific expansion generator 696. For example, the primary input table "A" may be associated with the storage sub-layer 694 for relational storage (e.g., M-STORAGE) that is associated with the specific expansion generator for relational storage (e.g., M-STORAGE) that is local.

Figure 10H:
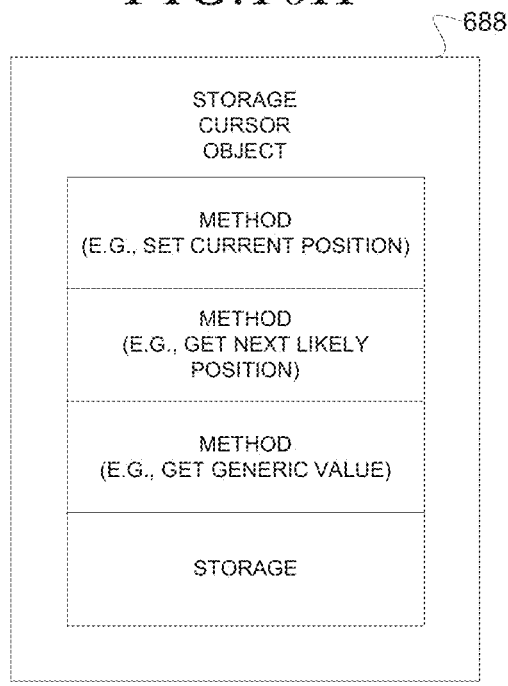
FIG. 10H is a block diagram illustrating a storage cursor object, according to an embodiment.

FIG. 10H is a block diagram illustrating a storage cursor object 688, according to an embodiment. The storage cursor object 688 may include methods and memory for storage. For example, the storage cursor object 688 may include methods to set the current position (e.g. database record), get the next likely position, get generic value, and other methods (not shown).

Figure 10I:
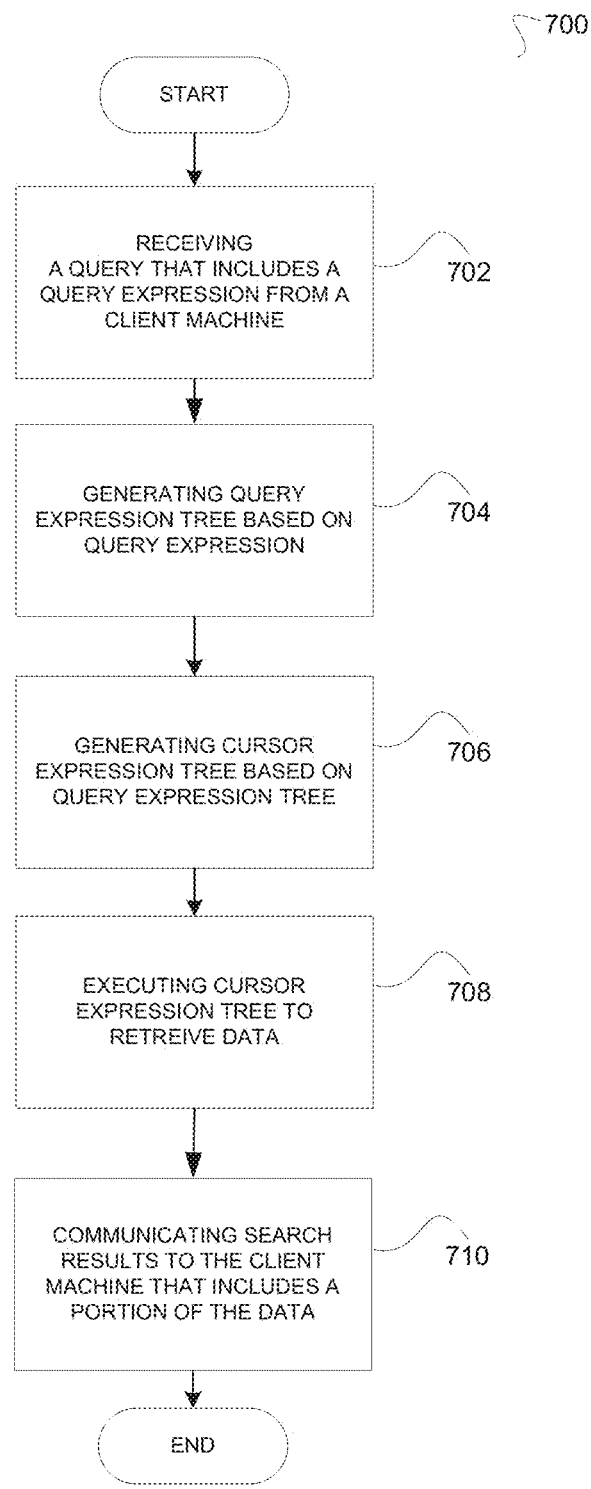
FIG. 10I is a block diagram illustrating a method to process a query with a unified storage interface, according to an embodiment.

FIG. 10I is a block diagram illustrating a method 700, according to an embodiment, to process a query with a unified storage interface. The method 700 may commence at operation 702 with a front-end server 58 at the information storage and retrieval platform 11 receiving a query from a client machine 33. For example, the query may include the keywords "BLACK IPOD NANO ACCESSORIES." The search front-end servers 58 may parse the query to generate query information 604, as described, and store the query information 604 in a query container 606. The query information 604 may include a query expression 608 that may be comprised of keywords and operators that either appear in the query or are implied as being in the query. For example, the query expression 608 may include "AND (IPOD, NANO)." The search front-end servers 58 may communicate the query container 606 to the search back-end servers 60 which process the query information 604 in the query container 606, as previously described, and communicate the query container 606 to a query node server 30 in an aggregation layer 616 of query node servers 30.

In one embodiment, the transformer 652 may perform an expansion function for the query information 604 in the query container 606. For example, the query expression 608 "AND (IPOD, NANO)" may be expanded to capture plural forms, synonyms, idioms, etc. In one embodiment, the transformer 652 may further perform a scatter/gather function by iterating the search of the query expression 608 and blending the results. The transformer 652 may generate the desired search result by initiating two searches in parallel. The transformer 652 may initiate the first search by communicating the query container 606 to a first query node server 30 in the aggregation layer 616 of query node servers 30 to request item information 80 for items that are offered for sale with an auction process and the second search by communicating the query container 606 to a second query node server 30 in the aggregation layer 616 of query node servers 30 to request item information 80 for items that are offered for sale with a purchase process, as previously described. The search results may be blended into a single search result, as previously described.

At operation 704, the query node server 30 in the aggregation layer may utilize the query engine 62 to generate a query expression tree 618 for each query information 604 entry in the query container 606. For example, the query engine 62 may generate the query expression tree 618 based on the query expression 608 in the query information 604 and store the query expression tree 618 in the query container 606. The query expression tree 618 may include nodes representing expressions in the query expression 608 that are logically connected with edges. For example, the query expression tree 618 for the query expression "AND (IPOD, NANO)" may include an operator expression node 680 for "AND," a term expression node 684 "IPOD" and a term expression node 684 for "NANO" where two edges lead away from the "AND" operator expression node 680, one leading to the "IPOD" term expression node 684 and the other leading to the "NANO" term expression node 684. Further, the query engine 62 may identify a single query node server 30 in each of the query node columns 94 of a grid 92 of query node servers 30 and communicate the query container 606 to the identified query node servers 30.

At operation 706, the query node servers 30 in respective query node columns 94 may receive the query container 606 and invoke the query engine 62 to invoke the query plan builder 654. The query plan builder 654 may process each query information 604 entry in the query container 606 to build (e.g., generate) an associated query plan 626. The query plan builder 654 may build the query plan 626 to include a cursor expression tree 628 that includes cursor objects that correspond to expression nodes in the query expression tree 618, as described more fully in method 750 on FIG. 10J.

At operation 708, the query engine 62 may execute the cursor expression tree 628 to retrieve data from a storage device 625. For example, the query engine 62 may execute a method in the storage cursor object 688 for "NANO" to retrieve records (e.g., item information 80) that include the string "NANO" from a storage device 625 (e.g., relational storage). Further, the query engine 62 may execute a method in the storage cursor object 688 for "IPOD" to retrieve records (e.g., item information 80) that include the string "IPOD" from a storage device 625 (e.g., relational storage). Finally, the query engine 62 may execute a method in the cursor object 686 for "AND" to "AND" the two sets of retrieved records and store the combined set in a table container 620 as results.

At operation 710, the query node server 30 may communicate table container 620 via the aggregation layer 616 to the search back-end servers 60 that, in turn, communicate the table container 620 to the search front-end servers 58 that, in turn, extract the search results from the table container 620 and communicate the search results to the client machine 33.

Figure 10J:
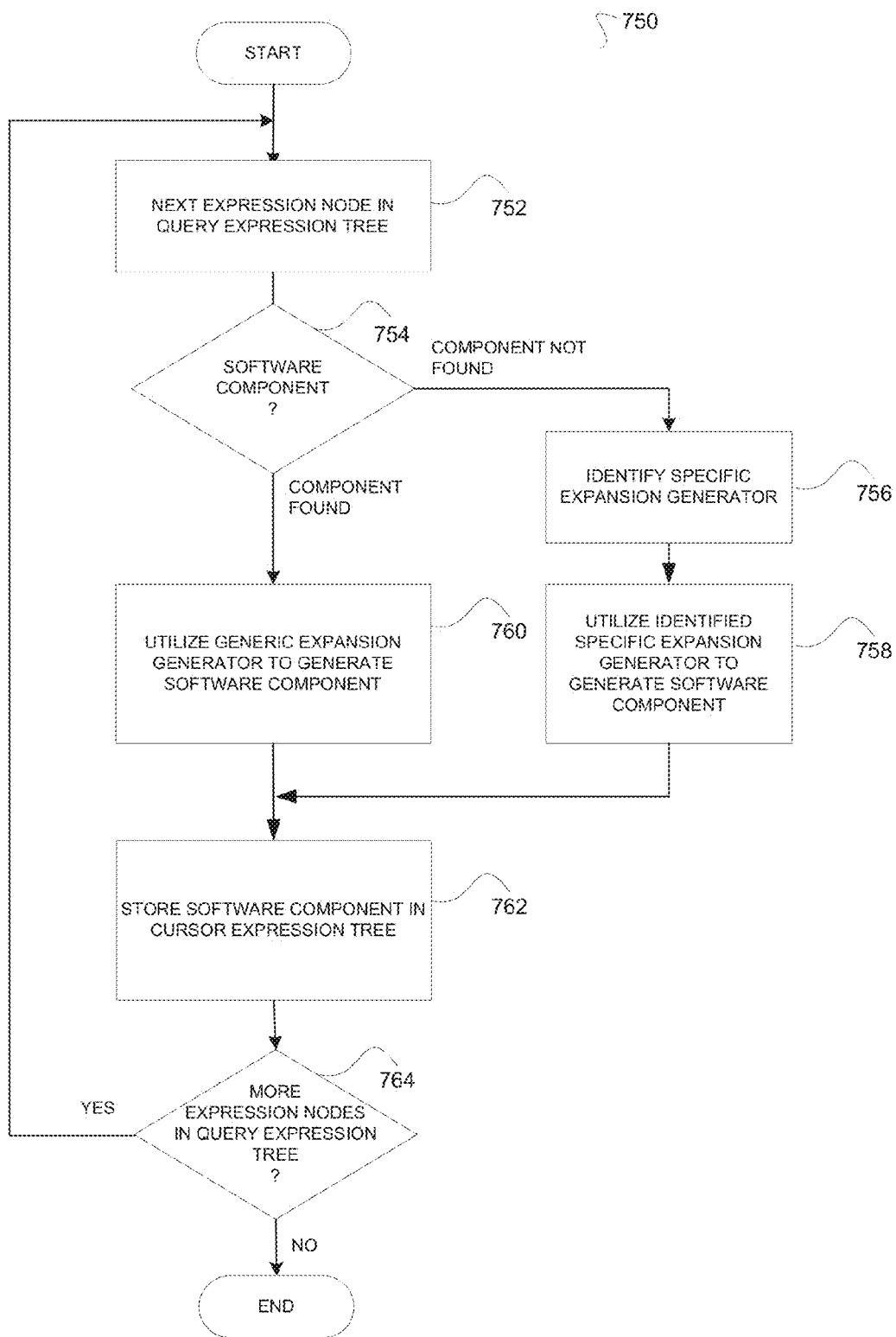
FIG. 10J is a block diagram illustrating a method to generate a cursor expression tree, according to an embodiment.

FIG. 10J is a block diagram illustrating a method 750, according to an embodiment, to generate a cursor expression tree 628. At operation 752, the query plan builder 654, at the query node server 30, may identify the next expression node in the query expression tree 618 as the current expression node. At decision operation 754, the query plan builder 654 may identify whether the current expression node corresponds to a software component. For example, the query plan builder 654 may invoke a generic expansion generator 692 (e.g., factory) that executes in the execution layer 622 to identify and instantiate a cursor object that corresponds to the current expression node. If a software component was identified then processing continues at operation 760. Otherwise processing continues at operation 756. At operation 756, the query plan builder 654 may identify the appropriate specific expansion generator 696 (e.g. factory) based on the primary input table 614 in the query information 604. For example, the query plan builder 654 may utilize the storage data dictionary 698 to associate the primary input table 614 in the query information 604 to the appropriate storage sub-layer 694 that is associated with a specific expansion generator 696. At operation 758, the query plan builder 654 may invoke the specific expansion generator 692 to identify a software component in the form of a storage cursor object 688. For example, the specific expansion generator 696 (e.g., factory) may execute in the storage layer 624 to identify and instantiate a storage cursor object 688 that corresponds to the current expression node. At operation 762, the query plan builder 654 may store the software component that was identified at the appropriate position in the cursor expression tree 628. At decision operation 764, the query plan builder 654 may identify whether there are more expression nodes in the query expression tree 618. If there are more expression nodes in the query expression tree 618 then processing continues at decision operation 752.

FIG. 11 is a network diagram depicting a networked system 800, within which one example embodiment may be deployed. The networked system 800 may embody the system 10 in FIG. 1 and, accordingly, the same or similar references have been used to indicate the same or similar features unless otherwise indicated. A network-based marketplace 812 provides server-side functionality, via a network 814 (e.g., the Internet or Wide Area Network (WAN)) to one or more clients. FIG. 11 illustrates, for example, a web client 816 (e.g., a browser, such as the Internet Explorer browser developed by Microsoft Corporation of Redmond, Wash. State) executing on client machine 820, a programmatic client 818 executing on client machine 822, and a mobile web client 833 executing on mobile device 811. For example, the mobile web client 833 may be embodied as one or more mobile modules that are used to support the Blackberry™ wireless hand held business or smart phone manufactured by Research In Motion of Waterloo, Ontario.

An Application Program Interface (API) server 824 and a web server 826 are coupled to, and provide programmatic and web interfaces respectively to, one or more application servers 828. The application servers 828 host one or more marketplace applications 830 and payment applications 832. The application servers 828 are, in turn, shown to be coupled to one or more database servers 834 that facilitate access to one or more databases 836

The marketplace applications 830 may provide a number of marketplace functions and services to users that access the network-based marketplace 812. The payment applications 832 may likewise provide a number of payment services and functions to users. The payment applications 832 may allow users to accumulate value in accounts and then to later redeem the accumulated value for products (e.g., goods or services) that are made available via the marketplace applications 830. The value may be accumulated in a commercial currency, such as the U.S. dollar, or a proprietary currency, such as "points." While the marketplace applications 830 and payment applications 832 are shown in FIG. 11 to both form part of the network-based marketplace 812, it will be appreciated that, in alternative embodiments, the payment applications 832 may form part of a payment service that is separate and distinct from the network-based marketplace 812.

Further, while the networked system 800 shown in FIG. 11 employs client-server architecture, embodiments of the present disclosure are of course not limited to such an architecture and could equally well find application in a distributed, or peer-to-peer, architecture system, for example. The various marketplace applications 830 and payment applications 832 could also be implemented as standalone software programs, which do not necessarily have networking capabilities.

The web client 816 and mobile web client 833 access the various marketplace applications 830 and payment applications 832 via the web interface supported by the web server 826. Similarly, the programmatic client 818 accesses the various services and functions provided by the marketplace applications 830 and payment applications 832 via the programmatic interface provided by the API server 824. The programmatic client 818 may, for example, be a seller application (e.g., the TurboLister application developed by eBay Inc., of San Jose, Calif.) to enable sellers to author and manage listings on the network-based marketplace 812 in an off-line manner, and to perform batch-mode communications between the programmatic client 818 and the network-based marketplace 812.

FIG. 11 also illustrates a third party application 829, executing on a third party server machine 831, as having programmatic access to the networked system 800 via the programmatic interface provided by the API server 824.

Figure 12:
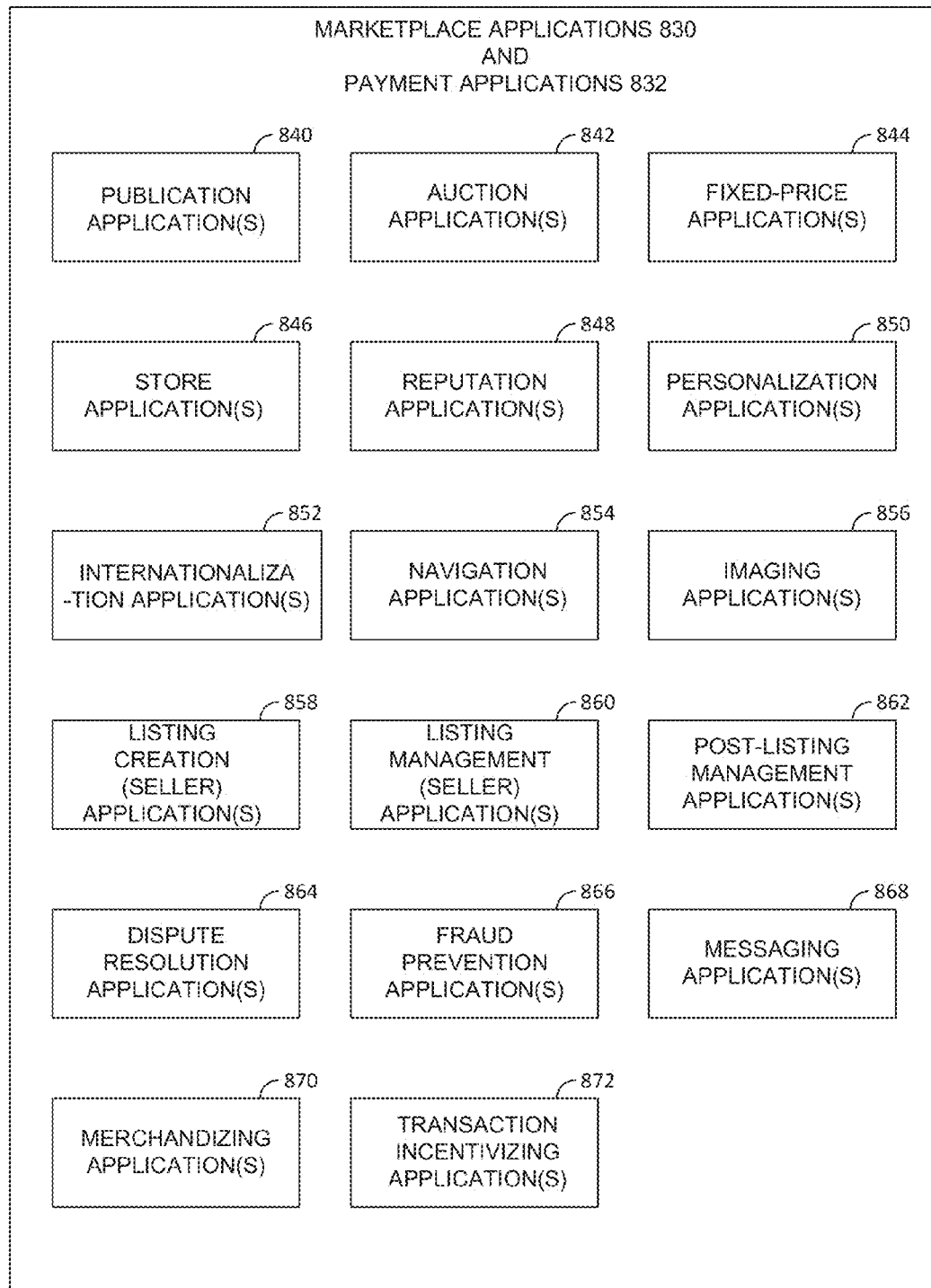
FIG. 12 is a block diagram illustrating marketplace and payment applications, according to an embodiment.

The mobile device 811 may be embodied as a mobile phone, a personal digital assistant (PDA), a cell phone, or any other wireless device that is capable of communicating with the network-based marketplace 812. For example, the mobile device 811 may be embodied as an iPhone mobile phone manufactured by Apple, Inc. of Cupertino, Calif. or, as previously mentioned, a Blackberry™ mobile phone manufactured by Research In Motion of Waterloo, Ontario.
Marketplace and Payment Applications FIG. 12 is a block diagram illustrating marketplace applications 830 and payment applications 832 that, in one example embodiment, are provided as part of the networked system 800 of FIG. 11. The marketplace applications 830 and payment applications 832 may be hosted on dedicated or shared server machines, as shown on FIG. 11, that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 836 via the database servers 834, as shown on FIG. 11.

The network-based marketplace 812 of FIG. 11 may provide a number of publishing, listing and price-setting mechanisms whereby a seller may list (or publish information concerning) goods or services for sale; a buyer can express interest in or indicate a desire to purchase such goods or services; and a price can be set for a transaction pertaining to the goods or services. To this end, the marketplace applications 830 are shown to include at least one publication application 840 and one or more auction applications 842 which support auction-format listing and price setting mechanisms (e.g., English, Dutch, Vickrey, Chinese, Double, Reverse auctions, etc.). The various auction applications 842 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 844 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings and may allow a buyer to purchase goods or services, which are also being offered for sale via an auction, for a fixed-price that is typically higher than the starting price of the auction.

Store application(s) 846 allows a seller to group listings within a "virtual" store, which may be branded and otherwise personalized by and for the seller. Such a virtual store may also offer promotions, incentives and features that are specific and personalized to a relevant seller.

Reputation applications 848 allow users that transact, utilizing the network-based marketplace 812, to establish, build and maintain reputations, which may be made available and published to potential trading partners. Consider that where, for example, the network-based marketplace 812 supports person-to-person trading, users may otherwise have no history or other reference information whereby the trustworthiness and credibility of potential trading partners may be assessed. The reputation applications 848 allow a user to establish a reputation within the network-based marketplace 812 over time, for example, through feedback provided by other transaction partners and by the computation of a feedback score based on the feedback. For example, the feedback score may be publicly displayed by the network-based marketplace 812. Other potential trading partners may then reference such a feedback score for the purposes of assessing credibility and trustworthiness.

Personalization applications 850 allow users of the network-based marketplace 812 to personalize various aspects of their interactions with the network-based marketplace 812. For example, a user may, utilizing an appropriate personalization application 850, create a personalized reference page at which information regarding transactions to which the user is (or has been) a party may be viewed. Further, a personalization application 850 may enable a user to personalize listings and other aspects of their interactions with the networked system 800 and other parties.

The networked system 800 may support a number of marketplaces that are customized, for example, for specific geographic regions. A version of the networked system 800 may be customized for the United Kingdom, whereas another version of the networked system 800 may be customized for the United States. Some of these versions may operate as an independent marketplace, or may be customized (or internationalized) presentations of a common underlying marketplace. The networked system 800 may accordingly include a number of internationalization applications 852 that customize information (and/or the presentation of information) by the networked system 800 according to predetermined criteria (e.g., geographic, demographic or marketplace criteria). For example, the internationalization applications 852 may be used to support the customization of information for a number of regional websites that are operated by the networked system 800 and that are accessible via respective servers 824 and 826 both of FIG. 11.

Navigation of the network-based marketplace 812 may be facilitated by one or more navigation applications 854. Merely for example, the navigation applications 854 may receive search information in the form of a query to search for items on the network-based marketplace and return search results responsive to the request. A browse application may allow users to browse various category, catalogue, or inventory data structures according to which listings may be classified within the networked system 800. Various other navigation applications may be provided to supplement the search and browsing applications. For example, the navigation applications 854 may include the event manager module 36, the scheduler module 48, the map-reduce job module 50, included in the system 10 to build and utilize a search infrastructure. Further, the navigation applications 854 may include other modules in the system 10 that are not presently mentioned. In order to make listings available via the networked system 800 as visually informing and attractive as possible, the marketplace applications 830 may include one or more imaging applications 856 with which users may upload images for inclusion within listings. An imaging application 856 also operates to incorporate images within viewed listings. The imaging applications 856 may also support one or more promotional features, such as image galleries that are presented to potential buyers. For example, sellers may pay an additional fee to have an image included within a gallery of images for promoted items.

Listing creation applications 858 allow sellers to conveniently author listings pertaining to goods or services that they wish to transact via the network-based marketplace 812, while the listing management applications 860 allow sellers to manage such listings. Specifically, where a particular seller has authored and/or published a large number of listings, the management of such listings may present a challenge. The listing creation applications may further include a processing module, communication module, and listing module that facilitate a buyer watching for specific types of listings. The listing management applications 860 provide a number of features (e.g., auto-relisting, inventory level monitors, etc.) to assist the seller in managing such listings.

One or more post-listing management applications 862 may also assist sellers with a number of activities that may typically occur post-listing. For example, upon completion of an auction facilitated by one or more auction applications 842, a seller may wish to leave feedback regarding a particular buyer. To this end, a post-listing management application 862 may provide an interface to one or more reputation applications 848, so as to allow the seller conveniently to provide feedback regarding multiple buyers to the reputation applications 848.

Dispute resolution applications 864 provide mechanisms whereby disputes arising between transacting parties may be resolved. For example, the dispute resolution applications 864 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 866 implement fraud detection and prevention mechanisms to reduce the occurrence of fraud within the network-based marketplace 812.

Messaging applications 868 are responsible for the generation and delivery of messages to users of the network-based marketplace 812, with such messages, for example, advising users regarding the status of listings at the network-based marketplace 812 (e.g. providing "outbid" notices to bidders during an auction process or to providing promotional and merchandising information to users). Respective messaging applications 868 may utilize any one of a number of message delivery networks and platforms to deliver messages to users. For example, messaging applications 868 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi (e.g., IEEE 802.11 technologies including 802.11n, 802.11b, 802.11g, and 802.11a)), Worldwide Interoperability for Microwave Access (e.g. WiMAX—IEEE 802.16) networks.

Merchandising applications 870 support various merchandising functions that are made available to sellers to enable sellers to increase sales via the network-based marketplace 812. The merchandising applications 870 also operate the various merchandising features that may be invoked by sellers and may monitor and track the success of merchandising strategies employed by sellers. The transaction incentivizing applications 872 operate to provide incentives for buyers and sellers to enter into and complete transactions.

Data Structures

Figure 13:
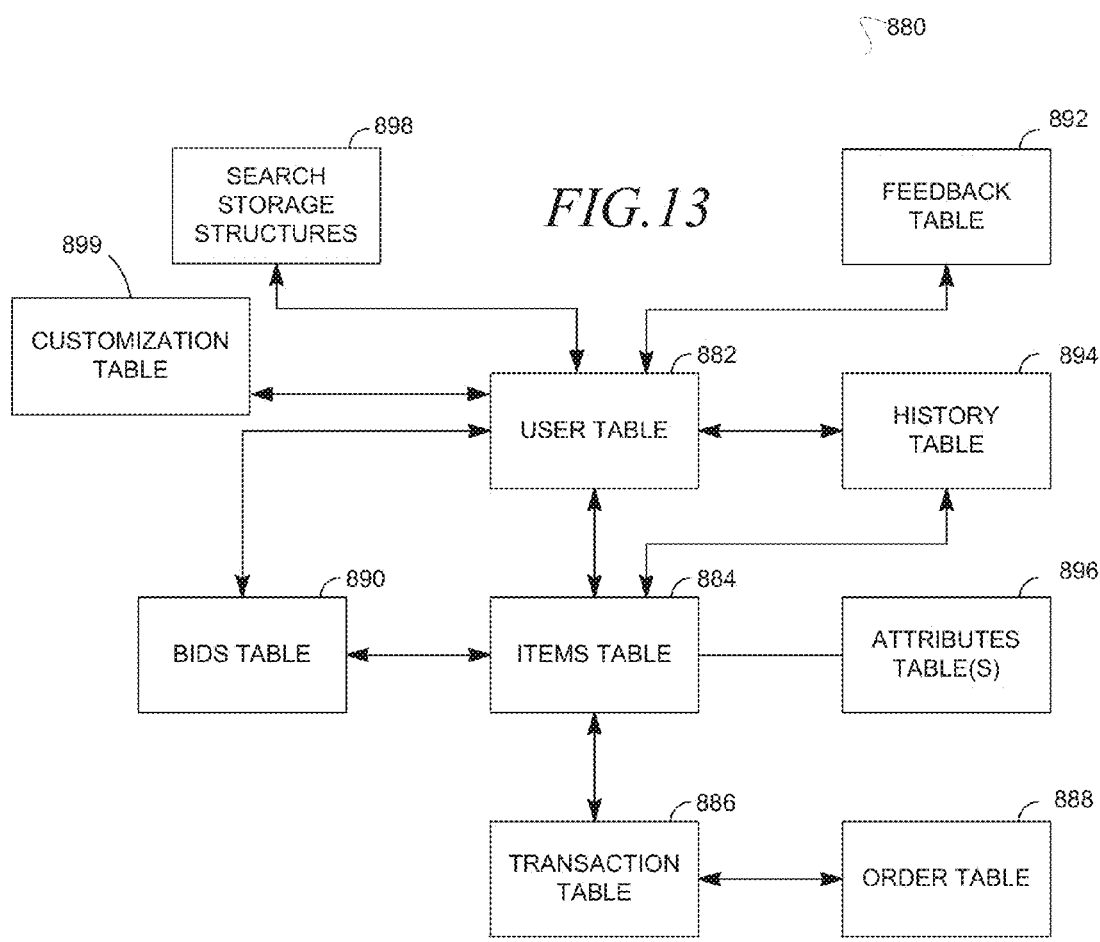
FIG. 13 is a high-level entity-relationship diagram, according to an embodiment.

FIG. 13 is a high-level entity-relationship diagram, illustrating various tables 880 storage structures that may be maintained within the databases 836 of FIG. 11, and that are utilized by and support the marketplace applications 830 and payment applications 832 both of FIG. 12. A user table 882 contains a record for registered users of the network-based marketplace 812 of FIG. 11. A user may operate as a seller, a buyer, or both, within the network-based marketplace 812. In one example embodiment, a buyer may be a user that has accumulated value (e.g., commercial or proprietary currency), and is accordingly able to exchange the accumulated value for items that are offered for sale by the network-based marketplace 812.

The tables 800 also include an items table 884 in which item records are maintained for goods and services that are available to be, or have been, transacted via the network-based marketplace 812. Item records within the items table 884 may furthermore be linked to one or more user records within the user table 882, so as to associate a seller and one or more actual or potential buyers with an item record.

A transaction table 886 contains a record for each transaction (e.g., a purchase or sale transaction or auction) pertaining to items for which records exist within the items table 884.

An order table 888 is populated with order records, with each order record being associated with an order. Each order, in turn, may be associated with one or more transactions for which records exist within the transaction table 886.

Bid records within a bids table 890 relate to a bid received at the network-based marketplace 812 in connection with an auction-format listing supported by an auction application 842 of FIG. 12. A feedback table 892 is utilized by one or more reputation applications 848 of FIG. 12, in one example embodiment, to construct and maintain reputation information concerning users in the form of a feedback score. A history table 894 maintains a history of transactions to which a user has been a party. One or more attributes tables 896 record attribute information pertaining to items for which records exist within the items table 884. Considering only a single example of such an attribute, the attributes tables 896 may indicate a currency attribute associated with a particular item, with the currency attribute identifying the currency of a price for the relevant item as specified in by a seller.

Search storage structures 898 may store information that is utilized to search the items table 884 and other tables. For example, the search storage structures 898 may be utilized by the system 10, as illustrated n FIG. 1, to build and utilize a search infrastructure, according to an embodiment. A customization table 899 may store customization records that may be utilized to customize the operation of the network-based marketplace 812.

Figure 14:
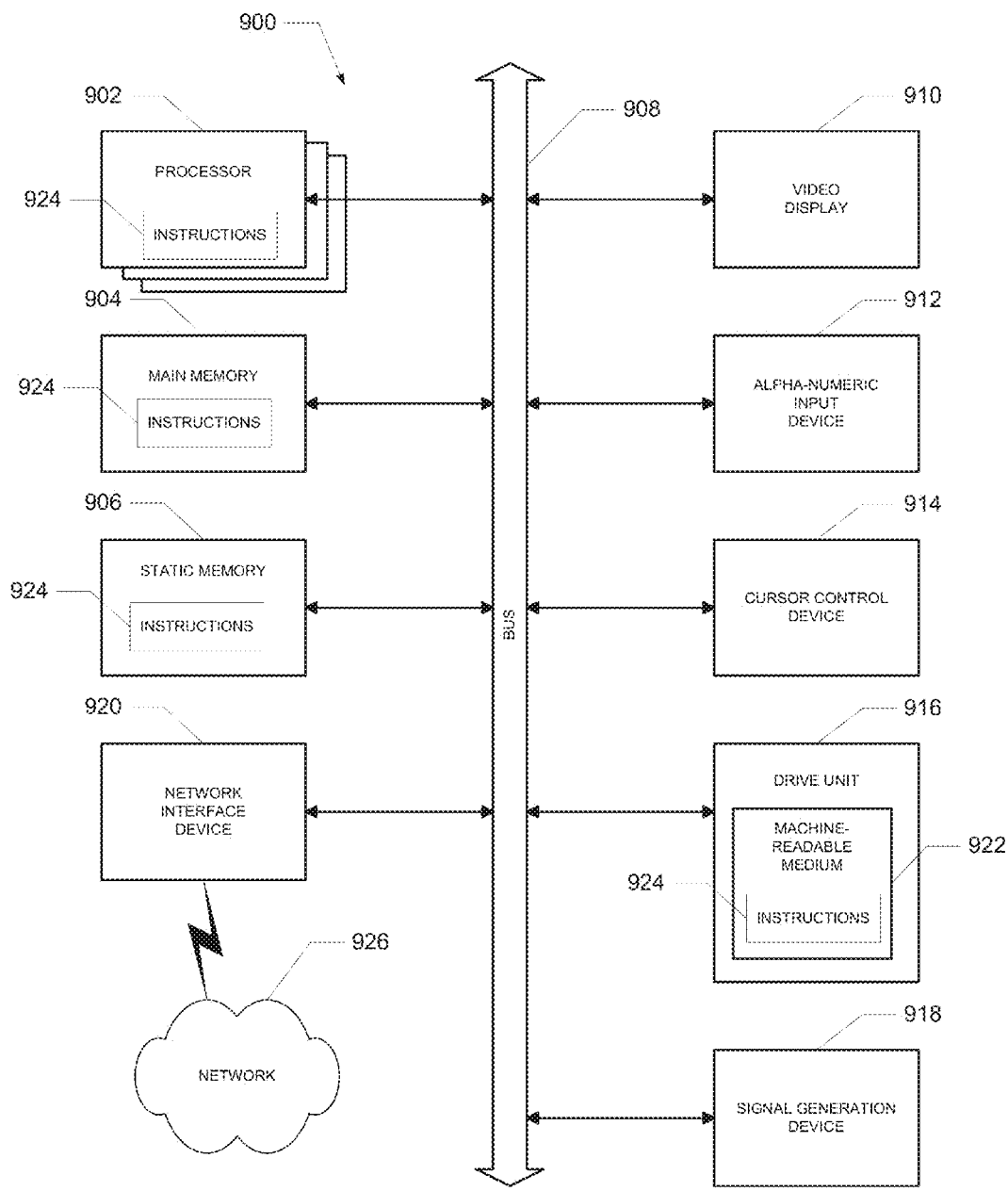
FIG. 14 shows a diagrammatic representation of a machine in the example form of a computer system, according to an example embodiment.

FIG. 14 shows a diagrammatic representation of a machine in the example form of a computer system 900 within which a set of instructions, for causing the machine to perform any one or more of the methodologies discussed herein, may be executed. In alternative embodiments, the machine operates as a standalone device or may be connected (e.g. networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The computer system 900 may further include a video display unit 910 (e.g. a liquid crystal display (LCD) or a cathode ray tube (CRT)). The computer system 900 also includes an input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions (e.g., software 924) embodying any one or more of the methodologies or functions described herein. The instructions (e.g., software 924) may also reside, completely or at least partially, within the main memory 904, the static memory 906, and/or within the processor 902 during execution thereof by the computer system 900. The main memory 904 and the processor 902 also may constitute machine-readable media. The instructions 924 may further be transmitted or received over a network 926 via the network interface device 920.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media and magnetic media. As noted, the software may be transmitted over a network using a transmission medium. The term "transmission medium" shall be taken to include any medium that is capable of storing, encoding or carrying instructions for transmission to and execution by the machine, and includes digital or analogue communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Software

In some embodiments, the methods described herein may be implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level and communicates the results of these logical/mathematical manipulations to the interface tier and/or to a backend, or storage, tier. These logical/mathematical manipulations may relate to certain business rules or processes that govern the software application as a whole. A third, storage tier may be a persistent storage medium or non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer-to-peer, or so some other suitable configuration. Further, these three tiers may be distributed between multiple computer systems as various software components.

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various APIs, and then compiled into one complete server, client, and/or peer software application. Further, these APIs may be able to communicate through various distributed programming protocols as distributed computing components.

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language by using a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transport Control Protocol/

Internet Protocol (TCP/IP) protocol stack model for defining the protocols used by a network to transmit data.

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN). WAN, or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods to build and utilize a search infrastructure are disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

We claim:

1. A system comprising:
a map-reduce job module to generate index information components in real-time based on a database that is time-stamped, the index information components comprise a full-index and a plurality of mini-indexes, the full-index comprises a snapshot of contents of the database at a first time, the plurality of mini-indexes respectively corresponding to a plurality of snapshots of updates to the database that correspond to a plurality of equal length time periods comprised of a start-time and an end-time;
a query engine to update the index information at a plurality of query node servers based on the index information components, the query engine to further receive a search query, over a network, from a client machine and identify search results based on the search query and the index information components; and
a front-end server to communicate the search results, over the network, to the client machine, wherein the plurality of query node servers includes a first query node server, wherein the plurality of mini-indexes includes a first mini-index and a second mini-index, wherein the query engine updates the index information components at the first query node server with the full-index and with the plurality of mini-indexes, updates the first query node server based on the first mini-index, and blocks an update of the index information components in the first query node server responsive to an identification of the second mini-index as arriving out of sequence.

2. The system of claim 1, wherein the full-index is associated with full-index bill of material information and the first mini-index is associated with a first mini-index bill of material information, wherein the full-index bill of material information includes a full-index identifier and the first mini-index bill of material information includes a full-index identifier.

3. The system of claim 2, wherein the query engine compares the full-index identifier in the full-index bill of material information with the full-index identifier in the mini-index bill of material information.

4. The system of claim 1, wherein the query engine blocks an update of the index information components in the first query node server responsive to receipt of the second mini-index and identification of the first mini-index as not stored in mini-index storage information.

5. The system of claim 1, wherein the query engine blocks an update of the index information components in the first query node server responsive to an identification that a received mini-index is not compatible with the full-index that was utilized to update the index information.

6. A method comprising:
generating index information components in real-time based on a database that is time-stamped, the index information components comprising a full-index and a plurality of mini-indexes, the full-index comprises a snapshot of contents of the database at a first time, the plurality of mini-indexes respectively corresponding to a plurality of snapshots of updates to the database that correspond to a plurality of equal length time periods comprised of a start-time and an end-time;
updating index information at a plurality of query node servers based on the index information components;
receiving a search query, over a network, from a client machine and identifying search results based on the search query and the index information components; and
communicating the search results, over the network, to the client machine, wherein the plurality of query node servers includes a first query node server, wherein the plurality of mini-indexes includes a first mini-index and a second mini-index, wherein the query engine updates the index information components at the first query node server with the full-index and with the plurality of mini-indexes, updates the first query node server based on the first mini-index, and blocks an update of the index information components in the first query node server responsive to an identification of the second mini-index as arriving out of sequence.

7. The method of claim 6, wherein the full-index is associated with full-index bill of material information and the first mini-index is associated with a first mini-index bill of material information, wherein the full-index bill of material information includes a full-index identifier and the first mini-index bill of material information includes a full-index identifier.

8. The method of claim 7, wherein the updating the index information comprises comparing the full-index identifier in the full-index bill of material information with the full-index identifier in the mini-index bill of material information.

9. The method of claim 6, wherein the updating the index information comprises blocking the first query node server from updating the index information components in the first query node server responsive to receiving the second mini-index and identifying the first mini-index as not being stored in mini-index storage information.

10. The method of claim 6, wherein the updating the index information components comprises the first query node server from updating the index information in the first query node server responsive to identifying that a received mini-index is not compatible with the full-index that was utilized to update the index information.

11. A non-transitory machine-readable medium comprising instructions, which when executed on a processor, cause the processor to perform a method comprising:

generating index information components in real-time based on a database that is time-stamped, the index information components comprising a full-index and a plurality of mini-indexes, the full-index comprises a snapshot of contents of the database at a first time, the plurality of mini-indexes respectively corresponding to a plurality of snapshots of updates to the database that correspond to a plurality of equal length time periods comprised of a start-time and an end-time;

updating index information at a plurality of query node servers based on the index information components;

receiving a search query, over a network, from a client machine and identifying search results based on the search query and the index information components; and communicating the search results, over the network, to the client machine, wherein the plurality of query node servers includes a first query node server, wherein the plurality of mini-indexes includes a first mini-index and a second mini-index, wherein the query engine updates the index information components at the first query node server with the full-index and with the plurality of mini-indexes u s dates the first query node server based on the first mini-index and blocks an update of the index information components in the first query node server responsive to an identification of the second mini-index as arriving out of sequence.

12. A system comprising:

a means to generate index information components in real-time based on a database that is time-stamped, the index information components comprise a full-index and a plurality of mini-indexes, the full-index comprises a snapshot of contents of the database at a first time, the plurality of mini-indexes respectively corresponding to a plurality of snapshots of updates to the database that correspond to a plurality of equal length time periods comprised of a start-time and an end-time;

a query engine to update index information at a plurality of query node servers based on the index information components, the query engine to further receive a search query, over a network, from a client machine and identify search results based on the search query and the index information components; and a front-end server to communicate the search results, over the network, to the client machine, wherein the plurality of query node servers includes a first query node server, wherein the plurality of mini-indexes includes a first mini-index and a second mini-index, wherein the query engine updates the index information components at the first query node server with the full-index and with the plurality of mini-indexes, updates the first query node server based on the first mini-index, and blocks an update of the index information components in the first query node server responsive to an identification of the second mini-index as arriving out of sequence.

\* \* \* \* \*